(12) United States Patent
Tryon, III et al.

(10) Patent No.: US 7,006,947 B2
(45) Date of Patent: Feb. 28, 2006

(54) METHOD AND APPARATUS FOR PREDICTING FAILURE IN A SYSTEM

(75) Inventors: Robert G. Tryon, III, Brentwood, TN (US); Animesh Dey, Brentwood, TN (US); A. Lorenz Nasser, Brentwood, TN (US)

(73) Assignee: Vextec Corporation, Brentwood, TN (US)

(*) Notice: Subject to any disclaimer, the term of this patent is extended or adjusted under 35 U.S.C. 154(b) by 127 days.

(21) Appl. No.: 10/043,712

(22) Filed: Jan. 8, 2002

(65) Prior Publication Data

US 2003/0004679 A1 Jan. 2, 2003

Related U.S. Application Data

(60) Provisional application No. 60/260,449, filed on Jan. 8, 2001.

(51) Int. Cl.
*G06F 11/30* (2006.01)

(52) U.S. Cl. ............................ 702/183; 702/185; 703/2; 714/47

(58) Field of Classification Search ............. 702/33–36, 702/58–57, 108, 113–115, 179, 181–185, 702/187–188; 705/2, 13–14, 18; 714/27–29, 714/40–42, 47; 706/46–47, 50, 59–61
See application file for complete search history.

(56) References Cited

U.S. PATENT DOCUMENTS

| 4,707,796 A | 11/1987 | Calabro et al. ............. 364/552 |
| 4,766,595 A | 8/1988 | Gollomp ..................... 371/23 |
| 4,985,857 A | 1/1991 | Bajpai et al. ........... 364/551.01 |
| 5,210,704 A | 5/1993 | Husseiny ................ 364/551.01 |
| 5,331,579 A | 7/1994 | Maguire, Jr. et al. ........ 364/578 |
| 5,465,321 A | 11/1995 | Smyth .......................... 395/22 |
| 6,085,154 A | 7/2000 | Leuthausser et al. ......... 702/34 |
| 6,199,018 B1 | 3/2001 | Quist et al. .................... 702/34 |
| 6,226,597 B1 | 5/2001 | Eastman et al. ............... 702/34 |
| 6,311,096 B1 | 10/2001 | Saxena et al. .............. 700/121 |
| 6,405,108 B1 * | 6/2002 | Patel et al. .................... 701/29 |
| 6,519,763 B1 * | 2/2003 | Kaufer et al. ................ 717/101 |

OTHER PUBLICATIONS

Tryon et al., "A Reliability–Based Model to Predict Scatter in Fatigue Crack Nucleation Life", Fatigue & Fracture of Engineering Materials & Structures 21:257–267 (© 1998 Blackwell Science Ltd.).

Tryon et al., "Probabilistic Mesomechanical Fatigue Crack Nucleation Model", Journal of Engineerig Materials and Technology, 119:65–69 (Jan. 1997).

Tryon, "Probabilistic Mesomechanical Fatigue Model", NASA Technical Report NASA/CR–97–202342, Apr. 1997, pp. 1–30.

\* cited by examiner

*Primary Examiner*—Marc S. Hoff
*Assistant Examiner*—Mary Catherine Baran
(74) *Attorney, Agent, or Firm*—Fish & Richardson P.C.

(57) ABSTRACT

The invention regards a system reliability or failure predicting apparatus and method that incorporates known information about system component failure into a system model and uses the model with or without other acquired system data to predict the probability of system failure. An embodiment of the method includes using probabilistic methods to create a system failure model from the failure models of individual system components, predicting the failure of the system based on the component models and system data, ranking the sensitivity of the system to the system variables, and communicating a failure prediction.

83 Claims, 11 Drawing Sheets

**ON-BOARD PROGNOSTIC INSTRUMENT ENGINEER
(OPIE)**

METHOD AND APPARATUS FOR PREDICTING FAILURE IN A SYSTEM

The patent claims priority pursuant to 35 U.S.C. §119 (e)1 to provisional application No. 60/260,449 filed Jan. 8, 2001.

This invention was made with Government support under DAAH01-01-C-R127 awarded by the U.S. Army Aviation and Missile Command. The Government has certain rights in this invention.

FIELD OF THE INVENTION

This invention relates to a method and apparatus for predicting failure of a system. More specifically it relates to a method and apparatus for integrating data measured from a system, and/or data referenced from other sources, with component failure models to predict component or overall system failure.

BACKGROUND OF THE INVENTION

Any product will eventually fail, regardless of how well it is engineered. Often failure can be attributed to structural, material, or manufacturing defects, even for electronic products. A failure at the component or sub-component level often results in failure of the overall system. For example, cracking of a piston rod can result in failure of a car, and loss of a solder joint can result in failure of an electronic component. Such failures present safety or maintenance concerns and often result in loss of market share.

A way to predict the impending failure of a system or component would be useful to allow operators to repair or retire the component or system before the actual failure, and thus avoid negative consequences associated from an actual failure.

Accurate prediction of impending structural, mechanical, or system failure could have great economic impact to industries within the aerospace, automotive, electronics, medical device, appliance and related sectors.

Engineers currently attempt to design products for high reliability. But it is most often the case that reliability information comes very late in the design process. Often a statistically significant amount of reliability data is not obtained until after product launch and warranty claims from use by consumers. This lack of data makes it common for engineers to add robustness to their designs by using safety factors to ensure that a design meets reliability goals.

Safety factors, however, are subjective in nature and usually based on historical use. Since modern manufacturers are incorporating new technology and manufacturing methods faster than ever before, exactly what safety factor is appropriate to today's new complex, state-of-the-art product is seldom, if ever, known with certainty. This complicates the engineering process. In addition, safety factors tend to add material or structural components or add complexity to the manufacturing process. They are counterproductive where industry is attempting to cut cost or reduce weight. Designing cost effective and highly reliable structures therefore requires the ability to reduce the safety factor as much as possible for a given design.

In attempting to reduce reliance on safety factors, designers have, over the years, developed models for the damage mechanisms that lead to failures. Failures can be attributed to many different kinds of damage mechanisms such as fatigue, buckling, and corrosion. These models are used during the design process, usually through deterministic analysis, to identify feasible design concept alternatives. But poor or less than desired reliability is often attributed to variability, and deterministic analysis fails to account for variability.

Variability affects product reliability through any number of factors including loading scenarios, environmental condition changes, usage patterns, and maintenance habits. Even a system response to a steady input can exhibit variability, such as a steady flow pipe with varying degrees of corrosion.

Historically, testing has been the means for evaluating effects of variability. Unfortunately, testing is a slow, expensive process and evaluation of every possible source of variability is not practical.

Over the years, probabilistic techniques have been developed for predicting variability and have been coupled with damage models of failure mechanisms to provide probabilistic damage models that predict the reliability of a population. But, given variability, a prediction of the reliability of a population says little about the future life of an individual member of the population. Safety factors are likewise unsatisfactory methods for predicting the life of an individual since they are based on historical information obtained from a population. Safety factors are also an unsatisfactory method for quickly and efficiently designing against failure since they rely on historical information obtained from test and component data. As a result, there exists a need for a method and apparatus for accurately predicting component and/or system failure that accounts for variability without the need for extensive test data on the component and/or system.

SUMMARY OF THE INVENTION

The present invention is a method and apparatus for predicting system failure, or system reliability, using a computer implemented model of the system. In an embodiment of the invention that model relies upon probabilistic analysis. Probabilistic analysis can incorporate any number of known failure mechanisms for an individual component, or components, of a system into one model and from that model can determine the critical variables upon which to base predictions of system failure. Failure can result from a number of mechanisms or combination of mechanisms. A probabilistic model of the system can nest failure mechanisms within failure mechanisms or tie failure mechanisms to other failure mechanisms, as determined appropriate from analysis of the inter-relationships between both the individual failure mechanisms and individual components. This results in a model that accounts for various failure mechanisms, including fatigue, loading, age, temperature, and other variables as determined necessary to describe the system. As a result of probabilistic analysis, the variables that describe the system can also be ranked according to the effect they have on the system.

Probabilistic analysis of a system predicts system and/or component failure, or reliability, based on acquired data in conjunction with data obtained from references and data inferred from the acquired data. This prediction of failure or reliability is then communicated to those using or monitoring the system. Furthermore, the analyzed system can be stationary or mobile with the method or apparatus of analysis and communication of the failure prediction being performed either on the system or remotely from the system. In addition, the apparatus may interface with other computer systems, with these other computer systems supplying the required data, or deciding whether and/or how to communicate a prediction.

An advantage of one embodiment of the invention is that it divides system variables into three types: directly sensed—those that change during operation or product use; referred—those that do not (significantly) change during operation or product use; and inferred—those that change during operation or use but are not directly sensed. This strategy divides the probabilistic approach into two broad categories, pre-process off-board analysis and near real time on-board or off-board analysis, allowing for prediction of a probability of failure based on immediate and historic use.

In one embodiment of the invention a computer implements a method for predicting failure in a system. This method comprises: measuring data associated with a system; creating a prediction of a failure of the system using a model of the system and the data; and communicating the prediction to a user or operator.

A second embodiment of the invention is an apparatus for predicting failure of a system. This apparatus comprises: sensors for acquiring data from the system and a computer, with the computer having a processor and memory. Within the memory are instructions for measuring the data from the sensors; instructions for creating a prediction of a failure of the system using a model and the data; and instructions for communicating the prediction. The apparatus also comprises communication means for communicating the prediction.

A third embodiment of the invention is a computer program product for predicting failure of a system for use in conjunction with a computer system. The computer program product comprises a computer readable storage medium and a computer program mechanism embedded therein. The computer program mechanism comprises: instructions for receiving data; instructions for storing the data; instructions for creating a prediction of failure of the system using a model and the data; and instructions for communicating this prediction. Furthermore, embodiments of these apparatuses and method use a system model developed with probabilistic methods.

BRIEF DESCRIPTION OF THE DRAWINGS

The foregoing and other aspects and advantages of the present invention will be better understood from the following detailed description of preferred embodiments of the invention with reference to the drawings, in which.

Like reference numerals refer to corresponding elements throughout the several drawings.

DETAILED DESCRIPTION OF THE PREFERRED EMBODIMENTS

An embodiment of the present invention uses sensed data combined with probabilistic engineering analysis models to provide a more accurate method for predicting the probability of failure of a component or a system. This embodiment uses probabilistic analysis models to address, on a component by component basis, the effects of the random nature associated with use, loading, material makeup, environmental conditions, and manufacturing differences. This embodiment assumes that the underlying physics of the system behavior is deterministic and that the random nature of the system response is attributed to the scatter (variability) in the input to the system and the parameters defining the failure physics.

The underlying physics of the system behavior is captured by developing a system response model. This model, which represents the nominal response of the system, uses random variables as input parameters to represent the random system behavior. The system response model may be based on the explicit mathematical formulas of mechanics of materials, thermodynamics, etc. Computational methods such as finite element analysis and computational fluid analysis, are sometimes used to assess the response of the system. Closely coupled with the system response models are failure models. The failure models, which address both initial and progressive damage, may be either in the form of maximum load interactive criteria, or more specific models, which have been developed by the system's original equipment manufacturers (OEMs), such as crack growth models.

Probabilistic analysis then determines the variation in the global system response as well as variation in the local system response. This probabilistic analysis also quantitatively assesses the importance of each of the random variables on the variation in the system response. This allows for development of a rational design framework for deciding which variables need to be controlled and how to increase the reliability of the system. The embodiment of the invention incorporating probabilistic analysis, therefore, provides for more accurate predictions of failure. Thus, this embodiment also provides a basis for more rational design decisions, while reducing expense and time to market.

Figure 1:
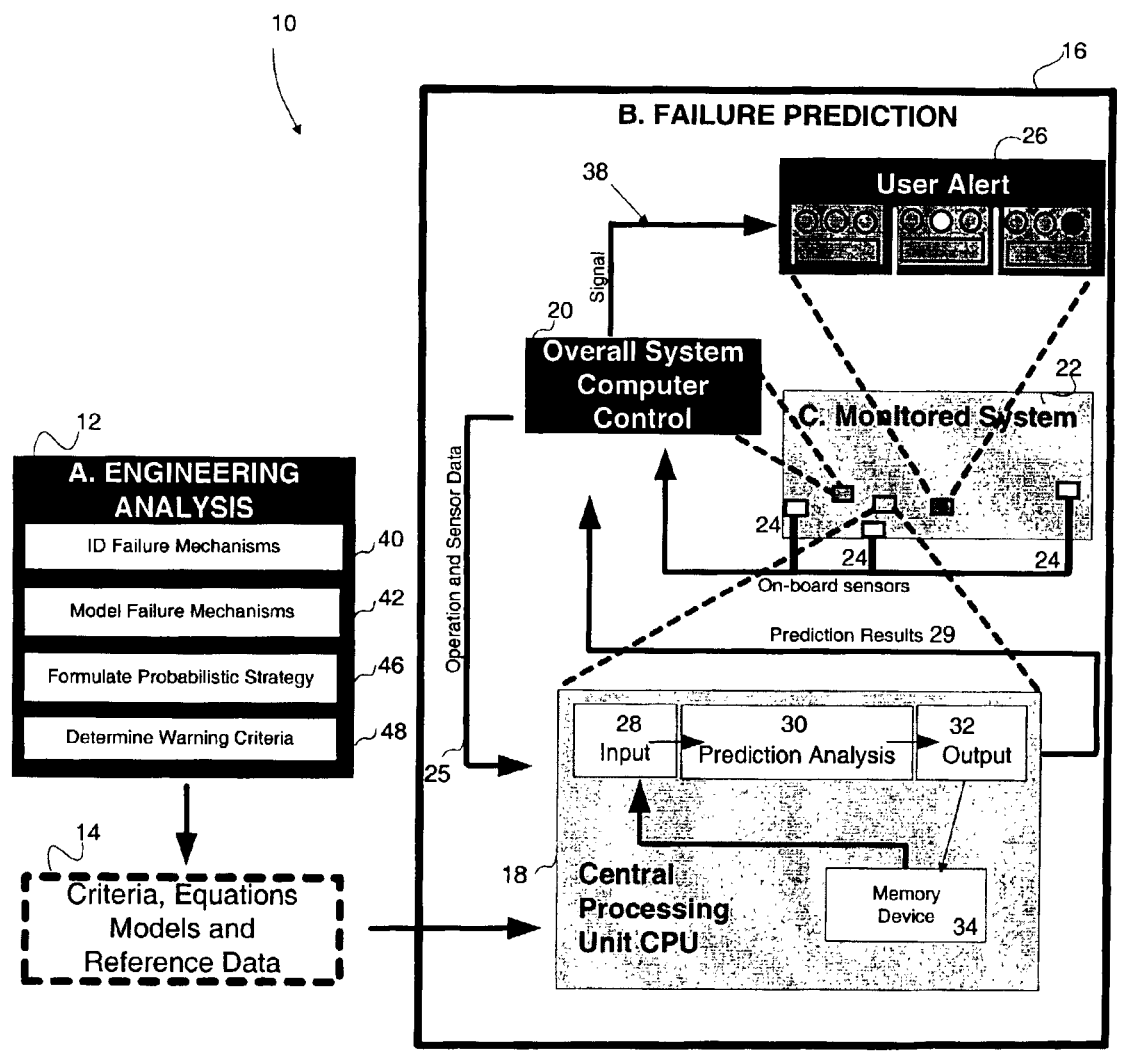
FIG. 1 is a schematic illustrating an embodiment of an apparatus of the present invention employed on a dynamic system and an indication of the process flow.

FIG. 1 is a schematic illustrating an embodiment of an apparatus of the present invention employed on a dynamic system 22. System 22 in this illustrative embodiment is an automobile with the embodiment described as a device in the automobile, but dynamic system 22 could be any dynamic system, such as a helicopter, airplane, automobile, rail car, tractor, or an appliance. On-board Prognostic Instrument Engineer (OPIE) 10, generally includes a central processing unit (CPU) 18; a computer control 20; a user alert interface 26; and sensors 24. The CPU 18 receives input in the form of criteria, equations, models, and reference data 14 derived from engineering analysis performed at step 12 and the OPIE 10 uses such input to make a failure prediction at step 16.

Engineering analysis step 12 essentially comprises the preparatory steps that produce the criteria, equations, models, and reference data 14 that are used in failure prediction step 16 to assess the condition of the system or component of interest. Engineering analysis step 12 includes the steps: identify failure mechanisms 40; model failure mechanisms 42; formulate probabilistic strategy 46; and determine warning criteria 48. Engineering analysis step 12 yields criteria, equations, models and reference data 14, which are further described and shown in FIG. 2(d).

Continuing with FIG. 1, criteria, equations, models and reference data 14 are stored on a memory device 34 or incorporated into a computer program product within CPU 18 as a prediction analysis 30. Desired criteria from criteria, equations, models and reference data 14 may also be programmed into overall system computer control 20.

Sensors 24 send information to computer control 20. Sensors 24 measure data on any number of conditions, such as temperature, speed, vibration, stress, noise, and the status and number of on/off cycles of various systems. Computer control 20 sends operation and sensor data 25 to CPU 18. Operation and sensor data 25 includes data from sensors 24 in addition to other data collected by computer control 20, such as ignition cycles, light status, mileage, speed, and numbers of activations of other sub-systems on system 22. CPU 18 creates input 28 by combining operation and sensor data 25 with information from memory device 34 and information from previous output data 32 that was stored in memory device 34.

CPU 18 analyzes input 28 as directed by prediction analysis 30 to produce the output data 32. Output data 32 contains a prediction result 29 and possibly other information. Output data 32 is then saved in memory device 34 while prediction result 29 is sent to computer control 20. Computer control 20 determines from criteria contained in criteria, equations, models and reference data 14, or from criteria developed separately, whether and how to signal user alert interface 26 based on prediction result 29. These criteria could be incorporated into CPU 18 instead, so that CPU 18 determined whether to activate user alert interface 26.

User alert interface 26 is a number of individual components, with status, or alert indicators for each as is necessary for the systems being analyzed for failure, such as, for example, a yellow light signal upon predicted failure exceeding stated threshold value. A variety of user alert signal devices could be appropriate for the specific situation. Computer control 20 could also be configured to de-activate certain components upon receipt of the appropriate prediction result, e.g., vehicle ignition could be disabled should prediction result 29 indicate a brake failure.

Figure 2A:
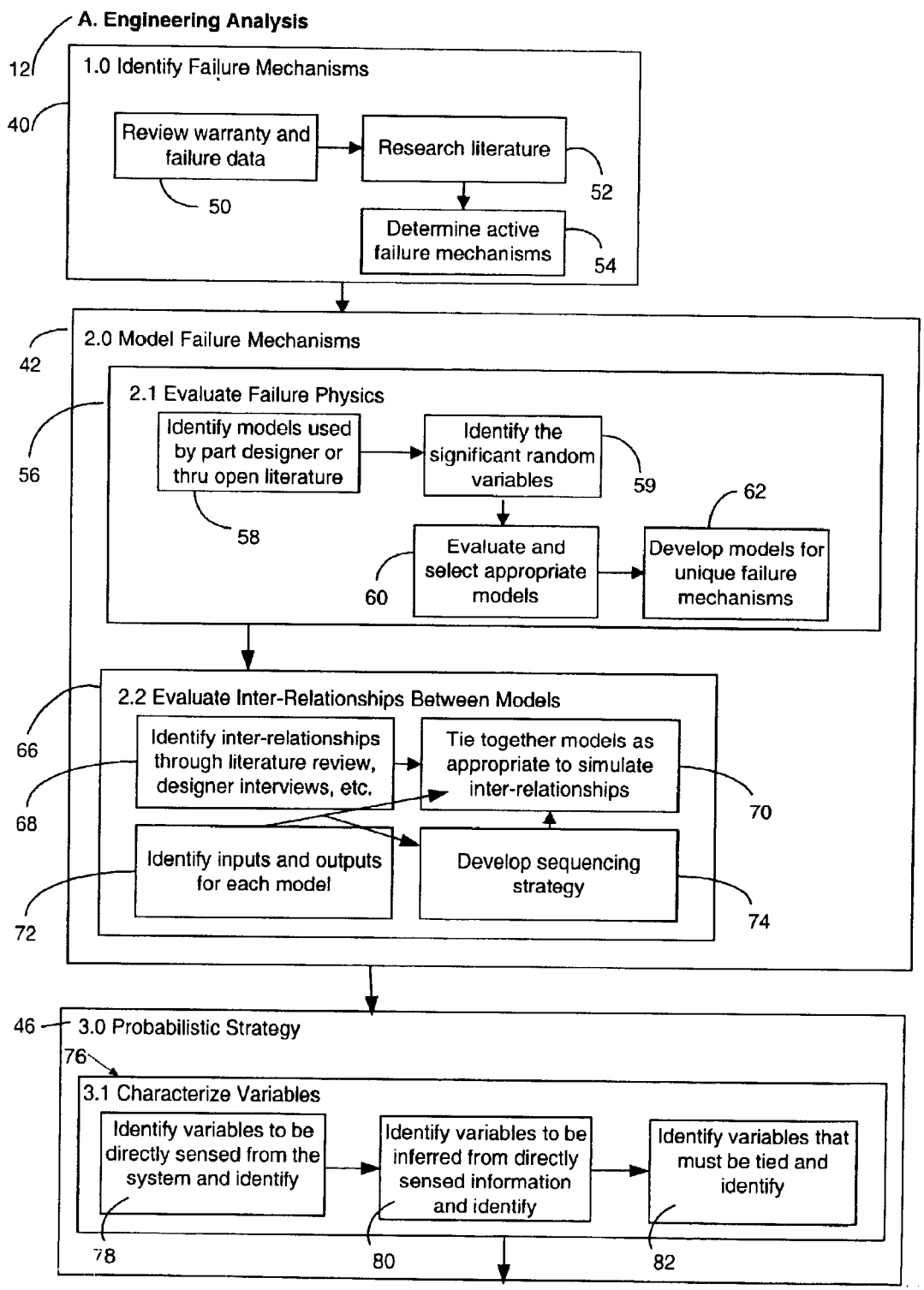
FIGS. 2(a)–(d) illustrate a preferred embodiment of the off-board engineering portion of an embodiment of a method of the present invention.
Figure 2B:
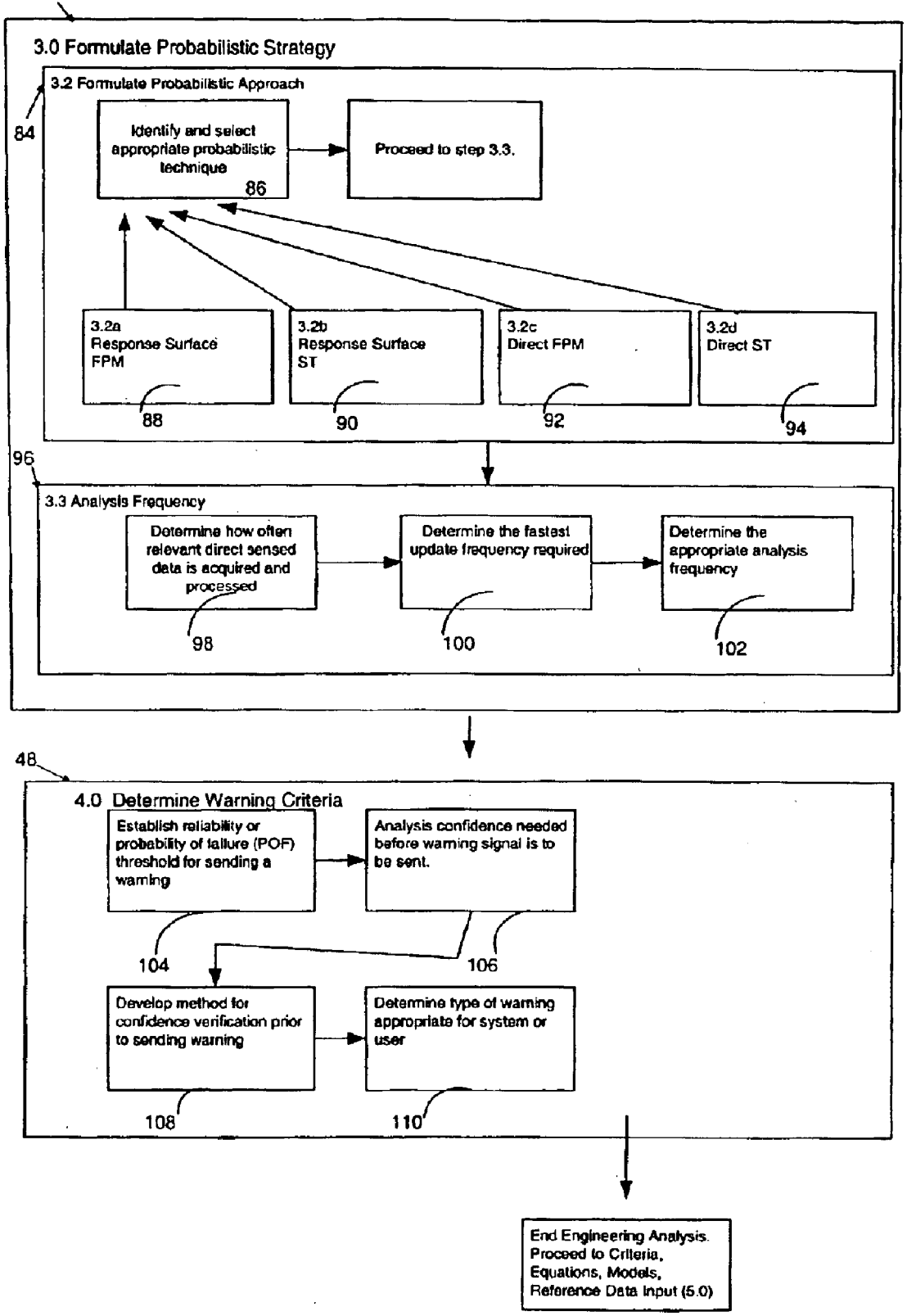
Figure 2C:
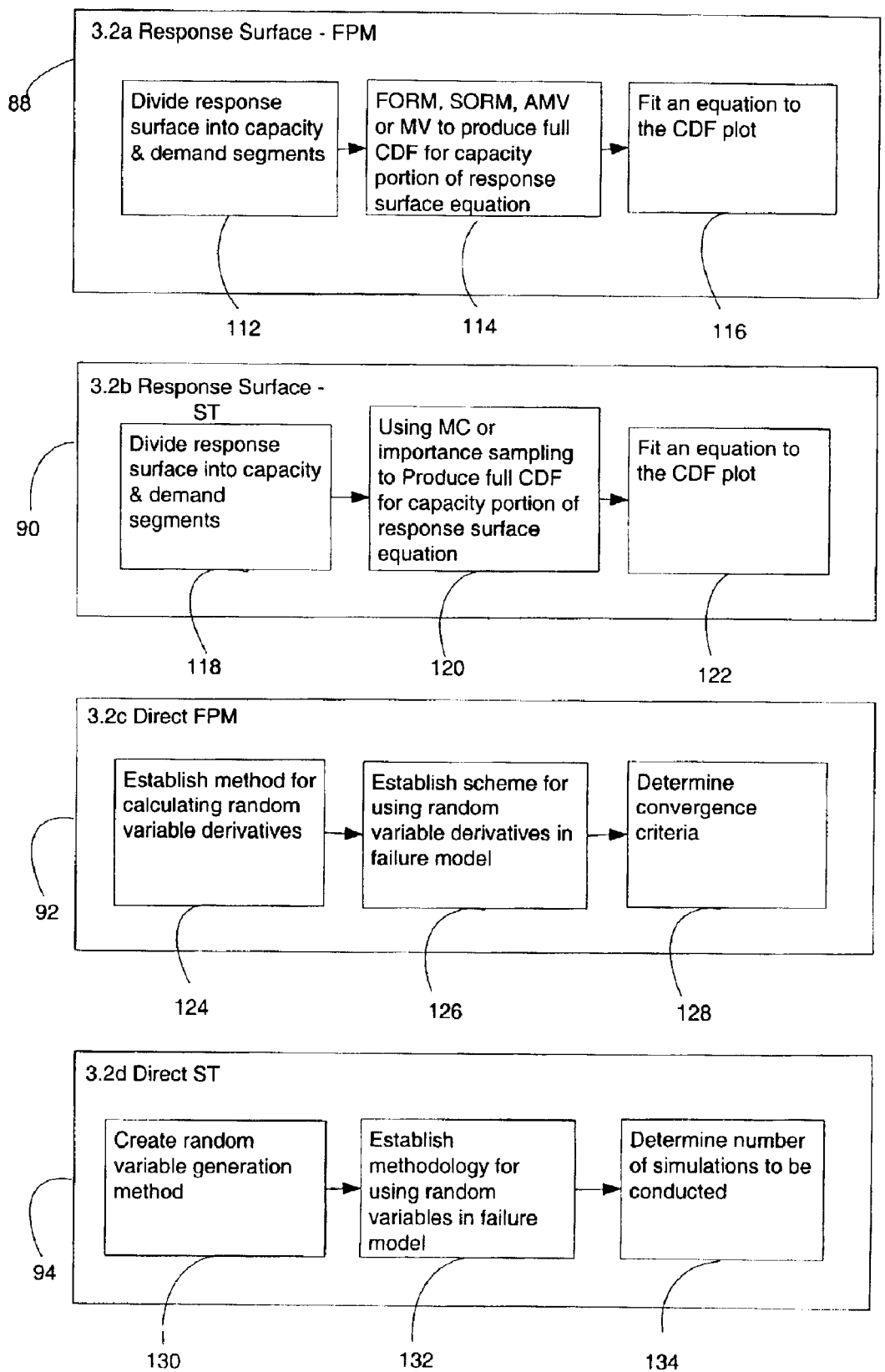
Figure 2D:
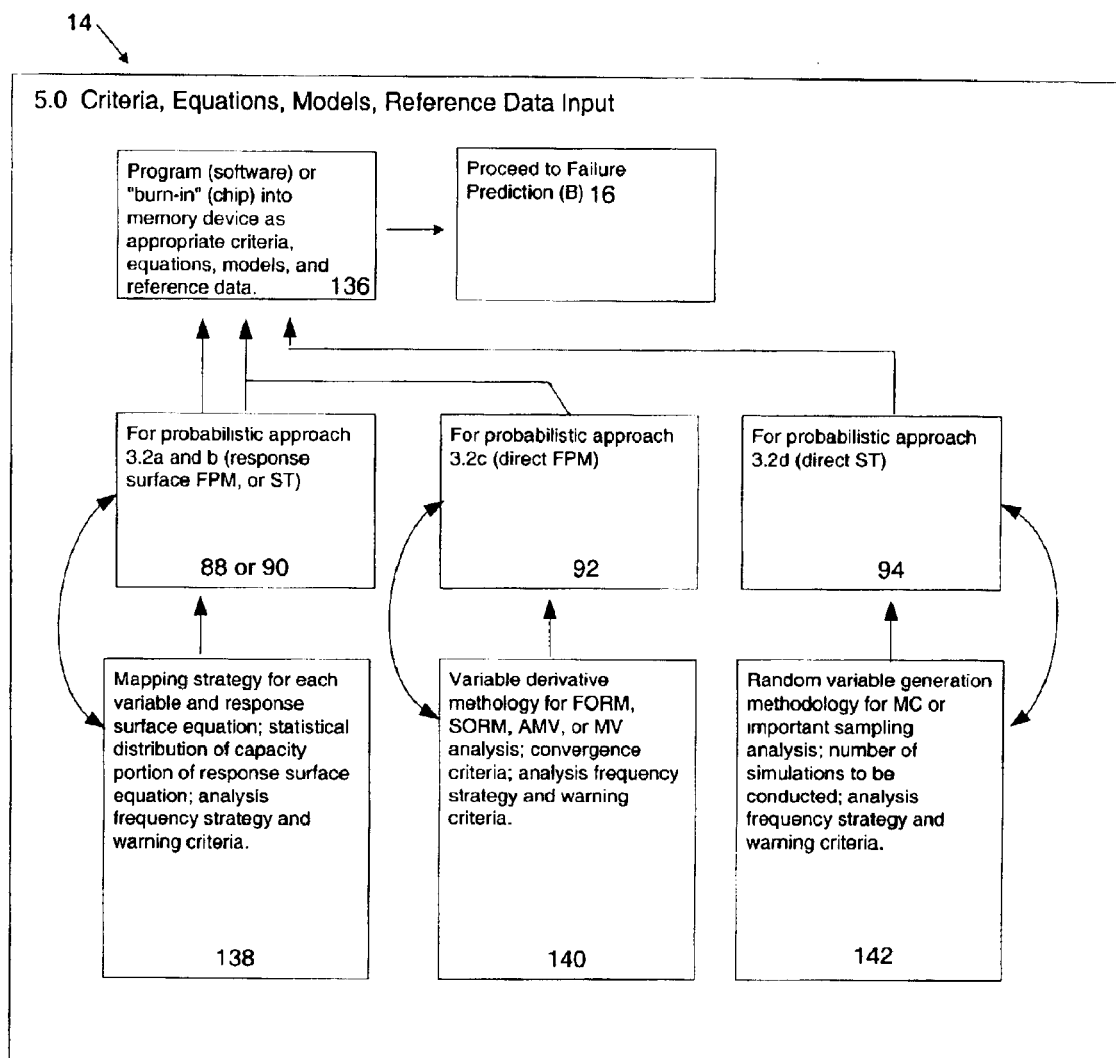

FIGS. 2(a)–2(d) are flow charts depicting the operation of engineering analysis process step 12 (FIG. 2(a)) that results in creation of criteria, equations, models, and reference data 14 (FIG. 2(d)). In FIG. 2(a) engineering analysis step 12 begins by identifying failure mechanisms at step 40 through review of warranty and failure data (step 50) and research of literature (step 52) to determine which of the identified failure mechanisms are actual active failure mechanisms (step 54). This effort could incorporate discussions with component design staff. Determination of active failure mechanisms can include a variety of evaluations, discussions and interpretations of both component and system response.

Failure mechanisms describe how and why the component fails. For example, mechanisms for delamination in a multi-layered material could include shear forces between the layers, adhesive decomposition, or manufacturing defects. Failure mechanisms are then modeled at step 42 by evaluating failure physics (step 56) while also evaluating the inter-relationships between models (step 66). Evaluating failure physics (step 56) requires identifying models from the designer or open literature (step 58), identifying the significant random variables (step 59), evaluating and selecting the appropriate models (step 60), and developing models for unique failure mechanisms (step 62) if no existing models are appropriate. Identifying the significant random variables (step 59) requires determining whether variation in a particular variable changes the outcome of the system. If so, then that variable is significant to some extent.

Inter-relationships between the selected models (step 66) are evaluated by literature review and designer interview (step 68) with the appropriate models tied together appropriately to simulate inter-relationships (step 70). Tying the models together as is appropriate to simulate inter-relationships (step 70) necessarily requires identifying inputs and outputs for each model (step 72) and a developing a sequencing strategy (step 74). Identifying inputs and outputs for each model also facilitates the developing a sequencing strategy (step 74).

FIGS. 2(a)–2(c) show how to formulate probabilistic strategy at step 46. Formulating probabilistic strategy is a method for predicting the probability of failure that considers the variability of the input and system parameters. Still referring to FIG. 2(a), the first step is to characterize variables (step 76). Variables are classified as those that can be directly sensed 78 or that can be inferred 80 from directly sensed information. Otherwise, variable values must come from reference information 82. A part of characterizing variables (step 76) is also to identify the randomness of each variable, i.e. determine the statistical variation of each variable.

Now referring to FIG. 2(b), formulation of probabilistic approach at step 84 requires identifying and selecting an appropriate probabilistic technique. Two primary probabilistic approaches may be appropriate for prediction analysis 30 (FIG. 1): fast probability methods (FPM), or simulation techniques (ST). FPM include response surface FPM 88 and direct FPM 92 techniques. A response surface approximates the failure physics of the system with a single mathematical relationship. A direct method can have disjoint mathematical relationships and is more simplistic. ST include response surface ST 90 and direct ST 94 as well (FPM and ST techniques are discussed further with reference to FIG. 2(c) below, and see Ang and W. Tang, Probability Concepts in Engineering Planning and Design, Vols. I and II, John Wiley & Sons, 1975.). Several factors must be considered during selection of probabilistic strategy (step 46) including: CPU 18 computational capacity or limitations; whether it is possible to formulate a response surface equation; the mathematical form of the selected failure models (steps 60, 62) (FIG. 2(a)); the needed prediction accuracy; the characteristics of the monitored system; and the desired update speed or efficiency, among others. All factors are weighed in the balance by one of skill in the art, recognizing that engineering analysis 12 (FIG. 1) must determine which probabilistic technique is most appropriate for prediction analysis 30 (FIG. 1) for the particular type of system 22 (FIG. 1).

The system itself may dictate the approach. Of the primary probabilistic techniques available for prediction analysis 30, direct FPM 92 and ST 94 methods will always provide a solution to the system that facilitates prediction analysis 30. Response surface FPM 88 and ST 90, however, do not always provide a workable solution. For example, a response surface cannot be formed when considering variables that vary with time and present discontinuities. Direct methods are then necessary. Potentially, such a situation could be handled using multiple nested response surface equations, but a single response surface equation will not suffice. Where a response surface may be used, however, its use can increase the efficiency of the prediction calculations.

Referring to FIG. 2(c), FPM optional approaches include first order reliability methods (FORM), second order reliability methods (SORM), advanced mean value (AMV) methods and mean value (MV) methods. ST optional approaches include Monte Carlo (MC) methods and importance sampling methods. These different methods are also discussed in further detail in an Example within.

Response surface techniques, whether response surface FPM 88 or ST 90 are divided into capacity and demand segments (steps 112, 118) respectively. For response surface FPM 88, one of the approaches of FORM, SORM, AMV methods, or MV methods is used to produce a full cumulative distribution function (CDF) for the capacity portion of the response surface equation (step 114). A CDF is a plot describing the spread or scatter in the results obtained from only the capacity portion. For response surface ST 90, either MC or importance sampling methods are used to produce a full CDF for the capacity portion of the response surface equation 120. An equation is then fit to the CDF plots (steps 116, 122).

Often the capacity section is based on referenced data 82 (FIG. 2(a)), while the demand section is based on sensed data 78 and inferred data 80. In such a case the equation from steps 116 and 122 produces a failure prediction for data representing referenced data 82, the capacity section of the response surface. Example 1, within, further illustrates this situation.

Direct techniques FPM 92 or ST 94 also have both capacity and demand designations, but no response surface is involved. Direct methods are therefore most often appropriate when a response surface cannot be created. The first step in direct FPM is to establish a method for generating random variables and calculating the corresponding random variable derivatives (step 124). The next step is to establish a scheme for using the random variable derivatives in a failure model (step 126). The failure model is the one developed in model failure physics (step 42) (FIGS. 1, 2(a)). The scheme established in step 126 serves to produce many random variable derivatives for input into the failure model from step 42 (FIGS. 1, 2(a)). Then one must determine the convergence criteria (step 128) to know when to cease inputting the random variable derivatives into the failure model.

Similarly, direct ST 94 uses the failure model from model failure physics (step 42). As with direct FPM, direct ST 94 must also create a random variable generation method (step 130). But direct ST 94 does not calculate derivatives of these random variables. The next step using direct ST 94 is to establish a method for using the random variables themselves in the failure model (step 132). And the last step is to determine the number of simulations to be conducted (step 134), which sometimes requires trial and error to determine the number of simulations necessary to give a failure prediction with the desired precision.

Returning to FIG. 2(b), the step 46 of formulating probabilistic strategy continues with a determination of the analysis frequency (step 96), or the frequency with which prediction analysis 30 (FIG. 1) analyzes input 28 (FIG. 1). To determine analysis frequency (step 96) one must determine how often relevant direct sensed data is acquired and processed (step 98), determine the fastest update frequency required (step 100) and determine the appropriate analysis frequency (step 102) for prediction analysis 30 (FIG. 1).

The last step 48 in engineering analysis step 12 (FIG. 1) is to develop warning criteria (FIG. 1). Continuing with FIG. 2(b), determining warning criteria 48 requires establishing the reliability or probability of failure (POF) threshold for sending a warning (step 104) based on prediction analysis 30 (FIG. 1). The next step is to set the level of analysis confidence needed before a warning signal is to be sent (step 106) and then to develop a method for confidence verification prior to sending the warning (step 108). At some point, listed last here, one must determine a type of warning appropriate for the system or user (step 110).

Now referring to FIG. 2(d), the results of the previous steps are programmed at step 136 into memory device 34 (FIG. 1) and CPU 18 (FIG. 1) as appropriate criteria, equations, models, and reference data. For response surface FPM 88 or ST 90, the appropriate criteria, equations, models, and reference data 14 include: a mapping strategy for each variable and response surface equation; a statistical distribution, or CDF, of the capacity portion of response surface equation; and an analysis frequency strategy and warning criteria 138. The mapping strategy essentially relates sensed, inferred, and referenced data to the variable in the analysis that represents that data. For direct FPM 92 the appropriate criteria, equations, models, and reference data 14 include: a variable derivative method for FORM, SORM, AMV methods, or MV methods analysis; a convergence criteria; and an analysis frequency strategy and warning criteria 140. And for direct ST 94 the appropriate criteria, equations, models, and reference data 14 include: a random variable generation method for MC or importance sampling analysis; a number of simulations to be conducted; and an analysis frequency strategy and warning criteria 142. One of ordinary skill in the art will know to mesh the invention with the system of interest in a way that allows both the invention and system to operate correctly.

Figure 3A:
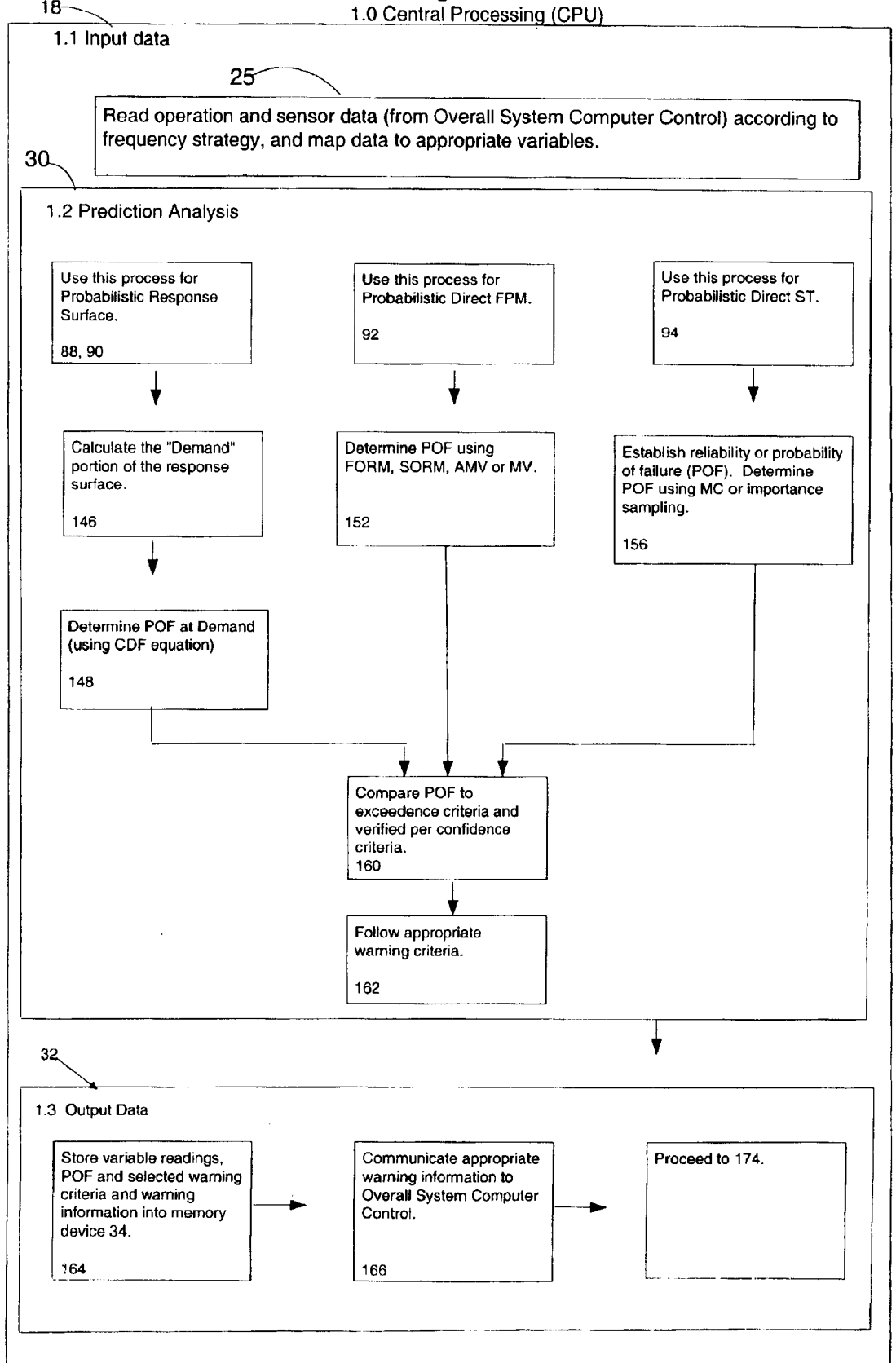
FIGS. 3(a) and (b) illustrate an embodiment of the on-board failure prediction portion of the method also depicted in FIGS. 2(a)–(d)
Figure 3B:
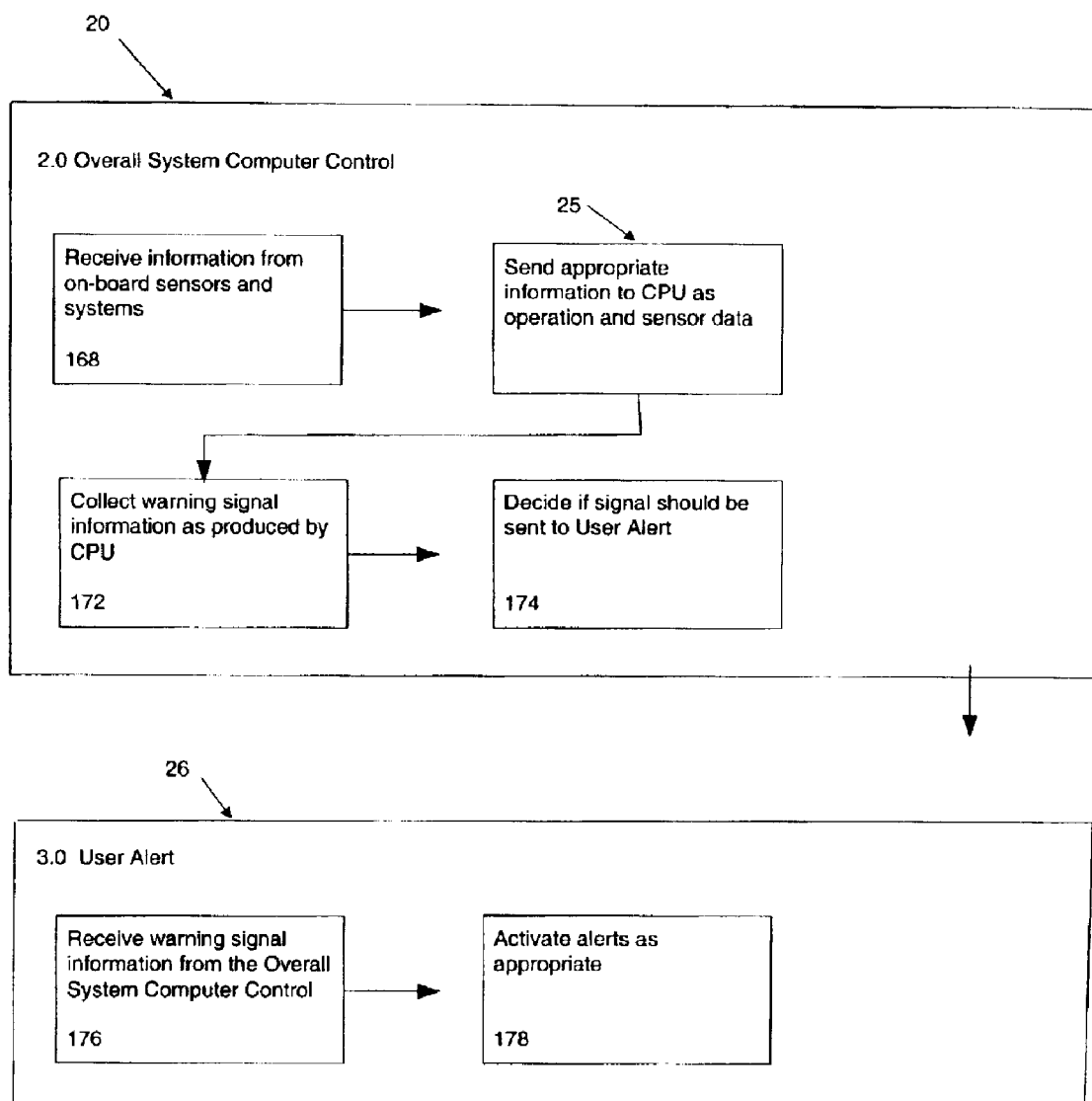

FIGS. 3(a) and 3(b) are flow charts that illustrate the operation of the failure prediction step 16 depicted schematically in FIG. 1. Referring to FIG. 3a, the step of prediction analysis 30 (FIG. 1) on CPU 18 (FIG. 1) receives the equations from criteria, equations, models, and reference data 14. Failure prediction is performed by CPU 18 in response to operations and sensor data 25 received from computer control 20. CPU 18 reads or receives operation and sensor data 25 from control computer 20 according to the frequency strategy. Operation and sensor data 25 are combined with referenced data 82 (FIG. 2(a)) from memory 34 to create input 28. CPU 18 maps the data in input 28 to the appropriate variables for prediction analysis 30.

Continuing with FIG. 3(a), prediction analysis 30 follows different paths depending upon the technique chosen: probabilistic response surface FPM 88, or ST 90; probabilistic direct FPM 92; or probabilistic direct ST 94.

For direct FPM 92, POF is determined at step 152 using FORM, SORM, AMV methods or MV methods as previously determined (see FIG. 2(d)). Then POF is compared at step 160 to exceedence criteria and verified per confidence criteria. Exceedence criteria for direct FPM 92 can be defined as the state when POF exceeds the established reliability or POF warning criteria threshold established at step 104 (FIG. 2(b)).

For direct ST 94, POF is determined at step 156 using MC or importance sampling methods as previously determined (see FIG. 2(d)). Then POF is compared at step 160 to exceedence criteria and verified per confidence criteria. Exceedence criteria can be defined as the state when POF exceeds the established warning criteria threshold value established at step 104. An example applicable to direct techniques 92 or 94 is where prediction analysis 30 determined POF at steps 152, 156 at 1.2 percent which was compared to POF threshold 104 of 1.0 percent, thus establishing the need for a warning signal.

For response surface FPM 88 or ST 90, the demand portion of the response surface is calculated at step 146 and the POF is determined at step 148 using the CDF equation. POF is then compared at step 160 to exceedence criteria and verified per confidence criteria. Exceedence criteria can be defined as the state when the demand portion of the response surface exceeds the capacity portion of the response surface that is determined during engineering analysis step 12 (FIG. 1).

An example applicable to response surface FPM 88 or ST 90 is where the CDF is represented by the simple equation POF=(constant)*(demand). The demand portion of the response surface calculated at step 146 yields at step 148 a POF that is then compared to POF threshold 104. POF is then verified using the method for confidence verification 108 (FIG. 2(b)) with memory device 34 (FIG. 1). For these analysis methods, if POF as determined at steps 148, 152, 156 is compared and verified at step 160 and meets the exceedence criteria, then in step 162 the warning criteria are followed and a warning is included in output data 32.

Output data 32 includes the variable readings; POF; selected warning criteria; and warning information. For example, output warning criteria could be to turn on a light when the calculated POF is greater than 1 percent. The demand variable readings; calculated values; POF; and selected warning criteria are stored at step 164 in memory device 34 and the appropriate warning information is communicated at step 166 as prediction results 29 to the vehicle computer control 20. Prediction results 29 may contain only a portion of the information in output data 32. The stored variable readings, POF, selected warning criteria and warning information 164 serve as input for subsequent cycles.

Now referring to FIG. 3(b), at step 168 computer control 20 (FIG. 1) receives information from on-board sensors 24 and systems and sends the appropriate operation and sensor data (FIG. 1) to CPU 18 (FIG. 1), forming part of input 28 (FIG. 1). Operation and sensor data 25 includes data from sensors 24 in addition to other data collected by computer control 20, such as ignition cycles, brake light status, mileage, speed, and numbers of activations of other systems on dynamic system 22. Computer control 20 also collects at step 172 warning signal information as produced by CPU 18 and decides at step 178 if a signal should be sent to user alert interface 26. At step 176 user alert interface 26 receives the warning signal information from overall system computer control and at step 178 activates alerts as appropriate. User alert interface 26 shows a number of individual components, with status, or alert, indicators for each as is necessary for the systems being analyzed for failure, such as, for example, yellow light 27.

Figure 4:
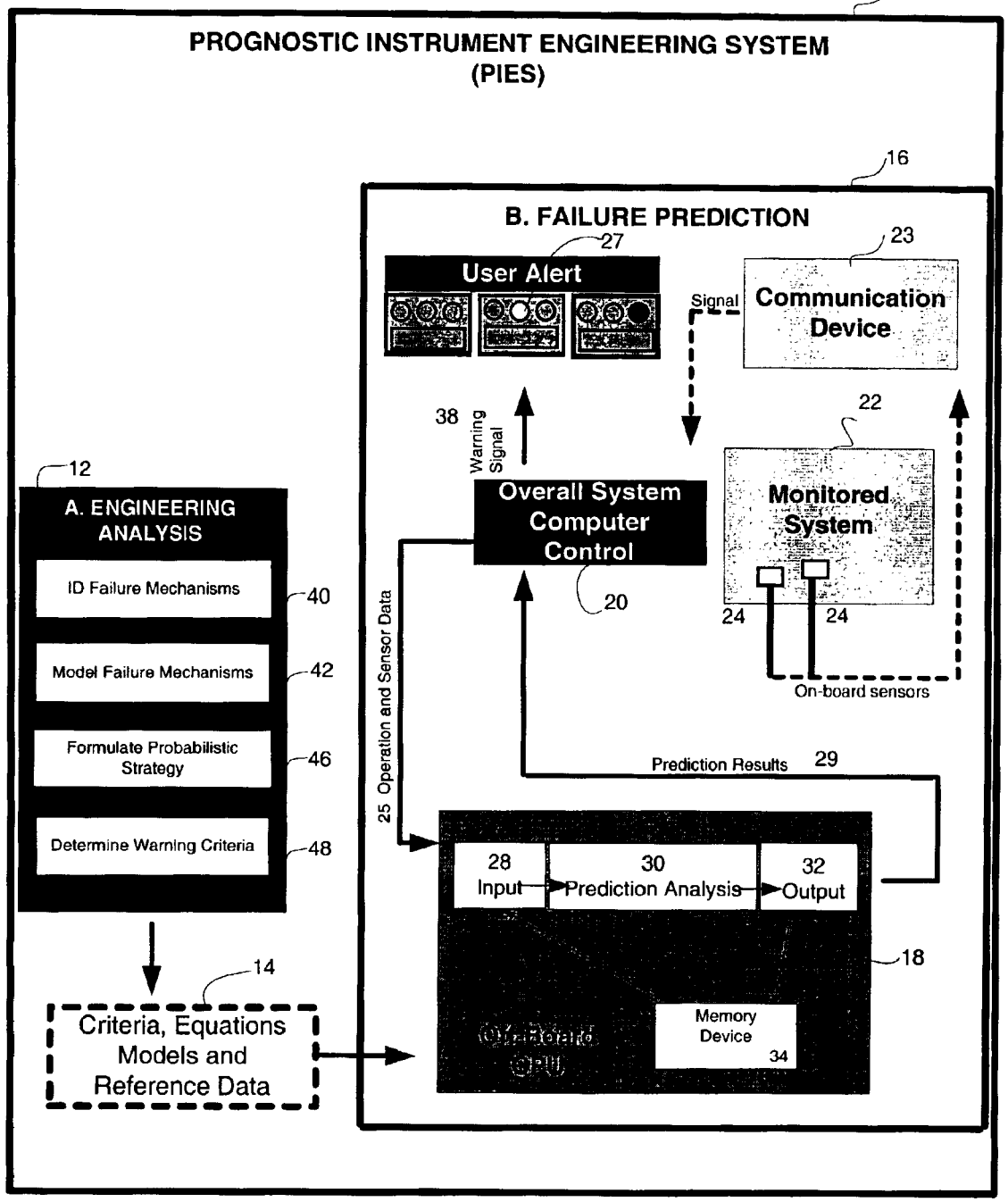
FIG. 4 illustrates an embodiment of the invention employed in a static system.
Figure 5A:
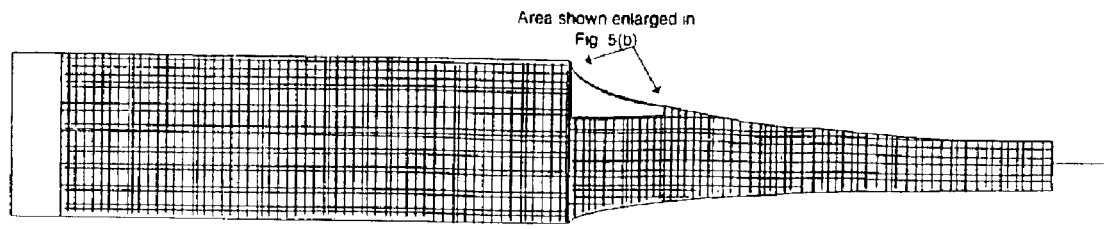
FIGS. 5(a)–5(f) illustrate an example of the method of FIGS. 1, 2, and 3 applied to a composite helicopter rotor hub.
Figure 5B:
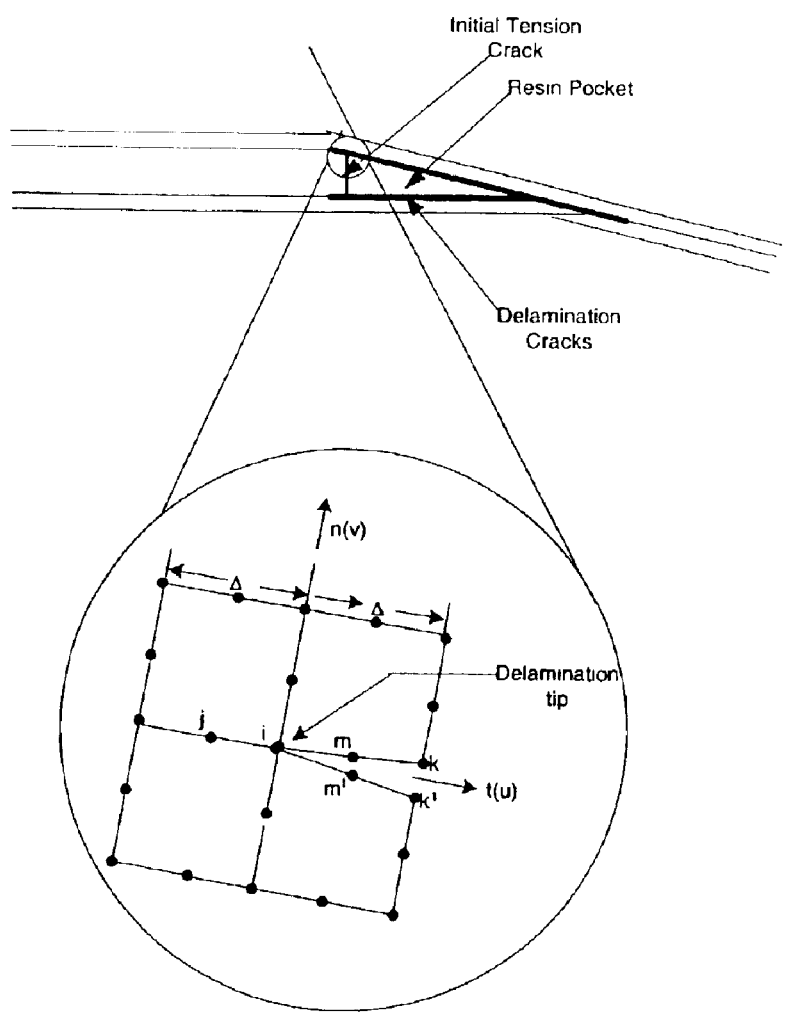
Figure 5C:
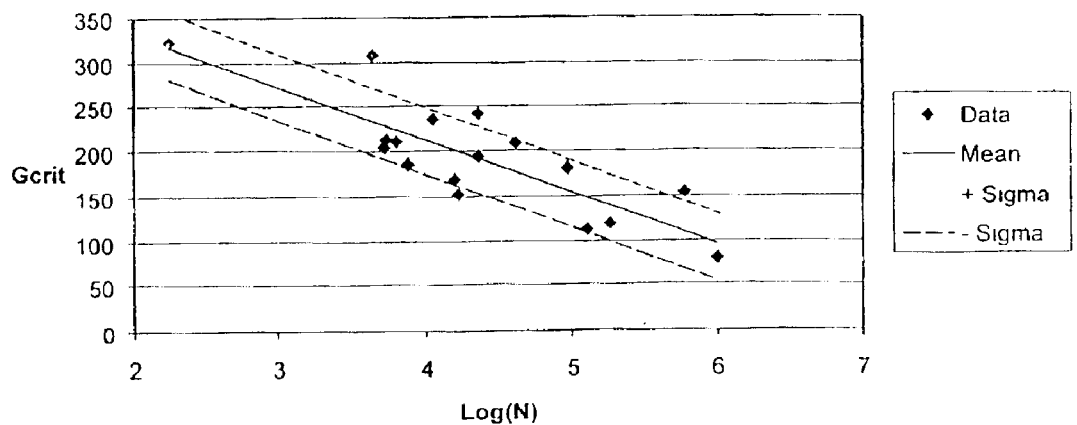
Figure 5D:
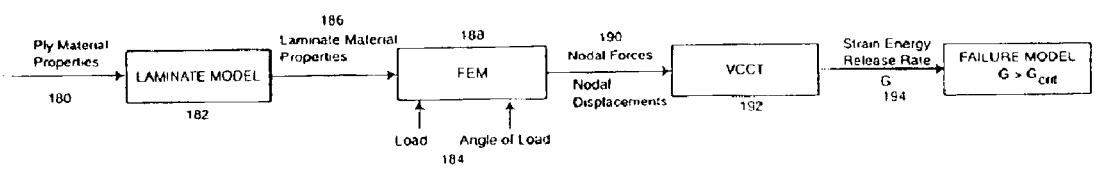
Figure 5E:
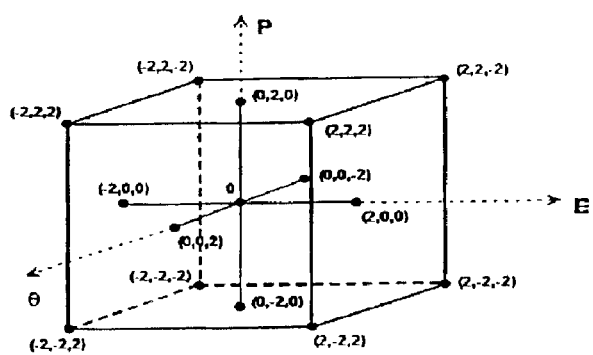
Figure 5F:
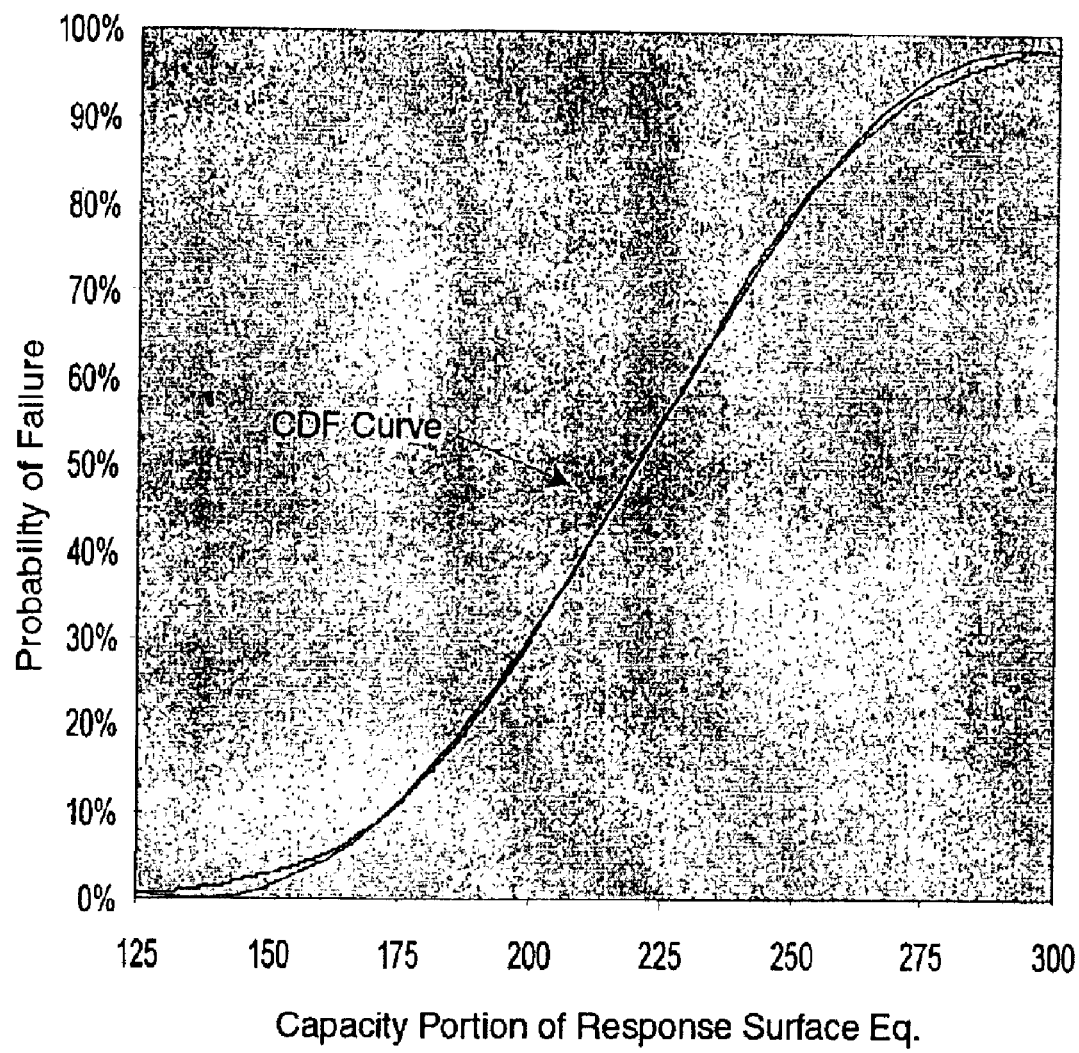

FIG. 4 is a schematic illustrating an embodiment of an apparatus of the present invention employed on a static system 22 and an indication of the process flow. Prognostic Instrument Engineering System (PIES) 11 would be used where system 22 is a structure such as a bridge or a moving structure such as an airplane where the on-board information (from operation and sensor data 25) is used for predictions analysis 30 using a CPU 18 that is not on the system 22. PIES 11 generally includes a central processing unit (CPU) 18; a computer control 20; a user alert interface 26; and sensors 24. The CPU 18 receives input in the form of criteria, equations, models, and reference data 14 derived from engineering analysis performed at step 12 and the PIES 11 uses such input to make a failure prediction at step 16. PIES 11 is substantially similar to OPIE 10 (FIG. 1), a difference being that CPU 18 resides off-board and thus communication device 23 is needed to transmit data from sensors 24 to overall system computer control 20.

Engineering analysis step 12 essentially comprises the preparatory steps that produce the criteria, equations, models, and reference data 14 that are used in failure prediction step 16 to assess the condition of the system or component of interest. Engineering analysis step 12 includes the steps: identify failure mechanisms 40; model failure mechanisms 42; formulate probabilistic strategy 46; and determine warning criteria 48. Engineering analysis step 12 yields criteria, equations, models and reference data 14, which were further described and shown in FIG. 2(d).

Continuing with FIG. 4, criteria, equations, models and reference data 14 are stored on a memory device 34 or incorporated into a computer program product within CPU 18 as a prediction analysis 30. Desired criteria from criteria, equations, models and reference data 14 may also be programmed into overall system computer control 20.

Sensors 24 measure data on any number of conditions, such as temperature, speed, vibration, stress, noise, and the status and number of on/off cycles of various systems. Data acquired by sensors 24 are transmitted via communication device 23 (for example: hard wire, satellite, and cell phone systems) to computer control 20. Computer control 20 sends operation and sensor data 25 to CPU 18. Operation and sensor data 25 includes data from sensors 24 in addition to other data collected by computer control 20, such as weather conditions. CPU 18 creates input 28 by combining operation and sensor data 25 with information from memory device 34 and information from previous output data 32 that was stored in memory device 34.

CPU 18 analyzes input 28 as directed by prediction analysis 30 to produce the output data 32. Output data 32 contains a prediction result 29 and possibly other information. Output data 32 is then saved in memory device 34 while prediction result 29 is sent to computer control 20. Computer control 20 determines from criteria contained in criteria, equations, models and reference data 14, or from criteria developed separately, whether and how to signal user alert interface 27 based on prediction result 29. These criteria could be incorporated into CPU 18 instead, so that CPU 18 determined whether to activate user alert interface 27.

User alert interface 27 is a number of individual components, with status, or alert indicators for each as is necessary for the systems being analyzed for failure, such as, for example, a yellow light signal upon predicted failure exceeding stated threshold value. A variety of user alert signal devices could be appropriate for the specific situation. Computer control 20 could also be configured to de-activate certain components upon receipt of the appropriate prediction result. For example, if a POF for a bridge structure exceeded exceedence criteria, the State Department of Transportation might request that a team of engineers visually inspect the bridge. Another example might be that PIES has predicted increased POF due to continuous heat cycling that may have degraded solder connections within an electronic component. Here a signal would be sent to the overall system computer control 20 and a flash message would be sent as signal 38 to the system operator user alert interface 26.

The principles of the present invention are further illustrated by the following example. This example describes one possible preferred embodiment for illustrative purposes only. The example does not limit the scope of the invention as set forth in the appended claims.

EXAMPLE 1

The following example describes the modeling and prediction of failure in an exemplary embodiment according to the present invention.

FIGS. 5(a)–5(f) illustrate a preferred embodiment of the invention applied to a single dynamic component, namely a composite helicopter rotor hub. Reference numerals refer to the elements as they were discussed with respect to FIGS. 1–4. In this example engineering analysis step 12 first incorporates a probabilistic approach using response surface FPM 88 techniques. Thereafter, the same example is used to demonstrate any difference that response surface ST 90, direct FPM 92, or direct ST 94 would have yielded.

A helicopter rotor hub is a structure to which the blades of the helicopter are attached. The rotor hub is a composite laminate structure, which means that it is manufactured by laying plies of composite sheets together and joining them (with an adhesive resin) to form an integral structure. Each composite sheet is called a ply. During flight, the rotor hub experiences continuous cyclic loading due to rotation of the helicopter blades, which causes structural fatigue failure. Upon inspection of failed hubs, it was determined that the initial cause was a cracking problem in the composite rotor hub. Thus, an identified failure mechanism was the cracking in the rotor hub. FIG. 5(*a*) shows a one-half schematic finite element model (FEM) of the hub. Upon closer examination, it was observed that cracking was occurring at the laminate ply interfaces as depicted in FIG. 5(*b*). After reviewing literature (failure reports in this case) and discussions with the part designer (step 52), the active failure mechanisms were determined (step 54) to be the cracking at the laminate ply interfaces. This was causing composite ply delamination. Thus, in general, an identified failure mechanism from steps 40, 50, 52, and 54 generally illustrates how and why a part failed.

The next step was to model the failure mechanism 42. The first step in modeling was to evaluate the failure physics (step 56). Discussions with the part designer identified a model (step 58) used to model the failure of similar parts; virtual crack closure technique (VCCT). VCCT was selected (step 60) to model the physics of delamination. VCCT was used to calculate the strain energy release rate (G) at the delamination (crack) tip. If the calculated strain energy release rate exceeded the critical strain energy release rate ($G_{crit}$), obtained from material tests, delamination failure was assumed to have occurred. VCCT was used to calculate the strain energy release rate (G) at the delamination tip such that:

$$G = G_I + G_{II} \quad \text{Eq. (1)}$$

where $$G_I = -\frac{1}{2\Delta}[F_{ni}(v_k - v_{k'}) + F_{nj}(v_m - v_{m'})]; \text{ and} \quad \text{Eq. (2)}$$

$$G_{II} = -\frac{1}{2\Delta}[F_{ti}(u_k - u_{k'}) + F_{nj}(u_m - u_m)] \quad \text{Eq. (3)}$$

In Eq. 2 and 3, u and v are tangential and perpendicular nodal displacements respectively and $F_t$ and $F_n$ are the tangential and perpendicular nodal forces respectively. Delamination onset was assumed to occur when the calculated G exceeded the $G_{crit}$ derived from material delamination tests. Since VCCT was adequate for modeling this failure mechanism no unique model needed to be developed as in step 62.

In this case, seven significant random variables were identified at step 59 and are shown in Table I, where:

| | |
|---|---|
| $E_{11}$, Msi | Longitudinal Young's modulus |
| $E_{22}$, Msi | Transverse Young's modulus |
| $G_{13}$, Msi | Shear modulus |
| $v_{13}$ | Poisson's ratio |
| P, kips | Tensile load |
| Φ, degrees | Bending angle |
| $G_{crit}$ | Critical strain energy release rate |
| N | Fatigue cycle |

TABLE I

The Significant Random Variable for the Response Surface Fpm Example
Random Variables

| Property | Mean | Std. Dev. |
|---|---|---|
| $E_{11}$, Msi | 6.9 | 0.09 |
| $E_{22}$, Msi | 1.83 | 0.05 |
| $G_{13}$, Msi | 0.698 | 0.015 |
| $v_{13}$ | 0.28 | 0.01 |
| P, kips | 30.8 | 3.08 |
| Φ, degrees | 12 | 1.67 |
| $G_{crit}$ | 448.56 − 58.57 $\text{Log}_e$ (N) | 36.6 $J^2/m$ |

Computation of strain energy release rate, G, required determination of nodal forces and displacements at the delamination tip as shown in FIG. 5(*b*). Determination of the nodal forces and displacements required development of a finite element model (FEM) for the rotor hub with the appropriate loads and material properties of the hub.

Referring to FIG. 5(*d*), the physics of failure for the rotor hub required a combination of different models. Once the models were selected at step 60 or developed at step 62, the next step was to evaluate inter-relationships between models at step 66. This involved identifying the inputs and outputs of each model (step 72) as well as identifying inter-relationships from the literature and designer interviews in step 72. Then the models were tied at step 70 and the overall model sequencing strategy developed at step 74. Since the material properties of the rotor hub were not readily available, they had to be derived from the material properties of the individual composite plies 180 using a laminate model 182 to give the laminate material properties 186. Laminate properties 186 and load data 184 were input into FEM 188 to yield nodal forces and displacements 190. Nodal forces and displacements 190 were input into VCCT 192 to yield strain energy rate (G) 194.

FIG. 5(*d*) shows that the calculated strain energy release rate, G was determined from the ply material properties 180 and the loads 184. G was the dependent variable and ply material properties and the loads were the independent variables. The next step was to develop a probabilistic strategy (step 46). First all the variables were characterized in step 76 in terms of randomness and as directly sensed 78, inferred 80, or referenced 82. $P_{max}$ and Φ are the directly sensed variables and the material properties, including $E_{11}$, $E_{22}$, $G_{13}$, and $V_{13}$, and $G_{crit}$ are inferred variables whose randomness is presented in Table I. The part designer had gathered test data on $G_{crit}$ versus the number of fatigue cycles (N). Based on the statistical analysis of this $G_{crit}$ vs. N data (see FIG. 5(*c*)), it was determined that $G_{crit}$ is a Gaussian (normal) random variable with its mean value and standard deviation shown in Table I. There are several different probabilistic assessment approaches (step 84) available. Direct ST 94 and FPM 92 and response surface ST 90 and FPM 88 techniques were discussed earlier and this example will apply each to the rotor hub.

One such approach is to use the first order reliability method (FORM), which is an example of a fast probabilistic method (FPM), in conjunction with the response surface, referred to previously as a response surface FPM (88)

approach. First a response surface must be developed relating G to the independent variables. Developing a response surface is widely discussed in the open literature. See A. Ang and W. Tang, *Probability Concepts in Engineering Planning and Design*, Vol. 1, John Wiley & Sons, 1975. Based on the seven random variables a Design of Experiment (DOE) scheme was chosen as shown in Table II.

TABLE II

Design of Experiments Scheme for Response Surface-FPM Approach

| Variable | Trial 1 | Trial 2 | Trial 3 | Trial 4 | Trial 5 | Trial 6 | Trial 7 |
|---|---|---|---|---|---|---|---|
| $E_{11}$ | 1 | 0 | 0 | 0 | 0 | 0 | 0 |
| $E_{22}$ | 0 | 1 | 0 | 0 | 0 | 0 | 0 |
| $G_{13}$ | 0 | 0 | 1 | 0 | 0 | 0 | 0 |
| v | 0 | 0 | 0 | 1 | 0 | 0 | 0 |
| P | 0 | 0 | 0 | 0 | 1 | 0 | 0 |
| Φ | 0 | 0 | 0 | 0 | 0 | 1 | 0 |
| Gcrit | 0 | 0 | 0 | 0 | 0 | 0 | 1 |
|  | ↓ | ↓ | ↓ | ↓ | ↓ | ↓ | ↓ |
| Strain Energy Rate Sensitivity to: | $E_{11}$ | $E_{22}$ | $G_{13}$ | v | P | Φ | Gcrit |

In Table II, Trial 1, $E_{11}$ was changed from its nominal value (mean value, indicated as 1), while all the remaining six variables were kept at their respective mean values (indicated as 0) and the value of G 194 was calculated. This process was repeated for each of the six other variables. Following this step, a regression analysis was performed and an initial response surface was developed that related G to all the seven significant random variables. After this, an Analysis of Variance (ANOVA) was performed to determine if all the seven significant random variables needed to be included in the response surface. The ANOVA results yielded that out of the seven random variables only 4 random variables ($G_{crit}$, $E_{11}$, P and Φ) needed to be included in the response surface. Based on this, an updated DOE scheme was adopted as shown in FIG. 5(*e*) to create a quadratic response surface equation. Regression analysis yielded the final response surface equation shown in Eq. (4). This strategy was verified by input of data published in the open literature and comparing the output results with results published in the open literature.

$$g = G_{crit} - 175.344*(0.569 - 0.0861 E_{11} + 0.023 P_{max} - 0.117\Phi - 0.000546 P^2_{max} + 0.00376\Phi^2 + 0.0046 P_{max}\Phi) \quad \text{Eq. (4)}$$

The next step in response surface FPM 88 (FIG. 2(*b*)) approach is to divide the response surface into the capacity and demand segments (step 112). The separation was as follows: Eq. (5) represents the capacity segment of Eq. (4) and Eq. (6) represents the demand segment of Eq. (4).

$$\text{Capacity} = G_{crit} - 175.344*(0.569 - 0.0861 E_{11}) \quad \text{Eq. (5)}$$

$$\text{Demand} = G_{crit} - 175.344*(0.023 P_{max} - 0.117\Phi - 0.000546 P^2_{max} + 0.00376\Phi^2 + 0.0046 P_{max}\Phi) \quad \text{Eq. (6)}$$

For this particular example, the variables in the capacity section of the response surface equation are the material property $E_{11}$ and $G_{crit}$. The variables in the demand portion of the response surface equation are the load (P) and the angle of the load (Φ). Eq. (5) was then used to produce a full CDF for the capacity portion of the response surface equation (step 114). This CDF is shown in FIG. 5(*f*) with capacity equated to the probability of failure.

Using FORM all the variables in the capacity portion of the response surface ($E_{11}$ and $G_{crit}$) are transformed to equivalent uncorrelated standard normal variables (Y1 and Y2). In the transformed uncorrelated standard normal space, a linear approximation is constructed to the capacity portion of the response surface and is given by the equation:

$$y = (9E-14)x^6 - (9E-11)x^5 + (3E-8)x^4 - (5E-6)x^3 + 0.0004x^2 - 0.0087x \quad \text{Eq. (7)}$$

To estimate the CDF using FORM a constrained optimization scheme is adopted to search for the minimum distance from the origin to the transformed response surface. Mathematically, the problem can be formulated as:

$$\text{Minimize such that } g(Y) = 0 \quad \text{Eq. (8)}$$

where, β is the minimum distance and g(Y) is the transformed capacity portion of the response surface. Several optimization routines are available to solve the above-constrained optimization problem. The method used in this example was formulated by Rackwitz and Fiessler. See Rackwitz, R. and Fiessler, B., *Reliability Under Combined Random Load Sequences*, Computers and Structures, Vol. 9, No. 5, pp. 489–494, 1978. A first order estimate of the failure probability is then computed as:

$$CDF = 1 - F(-\beta) \quad \text{Eq. (9)}$$

where F(−β) is the cumulative distribution function of a standard normal variable (i.e., a normal variable with zero mean value and unit standard deviation).

A graph of the resultant CDF is shown in FIG. 5(*f*). Although mathematical expressions exist to determine the CDF, these expressions involve multiple integrals, which can be quite cumbersome to evaluate. Hence to make the process of CDF computation faster and more tractable, an equation was fit to the CDF plot in step 116 using traditional curve fit methods. For this example relevant direct sensed data was acquired and processed (step 98) and POF could be predicted every flight cycle. Sensor data was also collected continuously during flight, but it was decided that POF would only be reviewed after every 2 flight cycles (step 102). It was then determined in step 104 that a POF greater than 1 percent would trigger a warning "No-Go" signal that would in turn activate a yellow light within user alert interface 26. Also it was decided that the method of confidence verification (step 108) was that, within the same flight cycle, a second POF will be determined based on updated sensor data. If prediction analysis 30 returned a POF greater than 1 percent two successive times within the same flight cycle a warning should be sent in step 110. That warning would be the "No-Go" signal that activated yellow light 27. This completed engineering analysis step 12.

Criteria, equations, models, and reference data 14, consisting of the variable mapping strategy, response surface equation, statistical distribution of capacity portion of the response surface equation, analysis frequency, and warning criteria were programmed into memory 34 in step 138.

Failure prediction (step 16) began by sending sensor data on the two directly sensed variables (step 25), which for this example were $P_{max}$ and $\Phi$. The next step 146 was to compute the demand portion of the response surface equation. The result from the demand portion of the response surface (Eq. (6)) was then input into the CDF equation derived from the capacity portion of the response surface equation (Eq. (7)). Thus, the current POF at demand was computed in step 148 based on the directly sensed data. The POF was calculated after every second flight cycle based on $P_{max}$. For this example the calculated demand (or sensed/inferred data) contribution from step 146 to the POF is shown in Table III for the selected cycle numbers after acquisition and analysis of the appropriate sensed and inferred data. In this example the capacity contribution is based on referenced data 82 and the demand contribution is based on sensed data 78 and inferred data 80, but as discussed earlier in the specification with reference to steps 112 and 118, the capacity and demand sections are not always based on the same data types.

TABLE III

Response Surface-FPM Prediction Results

| Cycle | P | θ | (demand) | POF | Warning |
|---|---|---|---|---|---|
| Cycle-1 | 30.8 | 12 | 68.52277995 | 0% | Go |
| Cycle-3 | 33.88 | 10.33 | 44.54782678 | 0% | Go |
| Cycle-5 | 27.72 | 13.67 | 86.06125102 | 0% | Go |
| Cycle-7 | 36.96 | 15.33 | 181.6366807 | 15% | Go |
| Cycle-7 | 37 | 16 | 201.9535041 | 17% | No-Go |

Table III also shows the POF determined at step 148 that is compared to the exceedence criteria at step 160. When POF exceeded one percent twice consecutively within the same cycle (cycle 7) the warning criteria was followed in step 162 and a "No-Go" warning was issued as part of output data 32. Output data 32 included all the values from Table III. These were stored in step 164 in memory 34 of CPU 18. Thus memory 34 stored cycle data that served as input for subsequent cycles. Of that data in Table III, in this example, only the warning or lack of warning of "No-Go" or "Go" was sent in step 166 to the equivalent of control computer 20. After collecting the warning signal of "No-Go" in step 172, control computer 20 decided in step 174 that the warning required further communication to user alert interface system 26. Upon receipt of the warning at step 176, user alert interface 26 activated a yellow cockpit indicator light and highlighted "check rotor hub" on a malfunction monitor.

A difference between the response surface FPM 88 and ST 90 approaches is the method used to create the CDF. This response surface ST approach used Monte Carlo (MC) methods to produce the CDF. Like the response surface FPM approach 88, the first step in the response surface ST 90 approach was to separate the response surface equation into capacity and demand portions at step 118. Following the division of the response surface, Monte Carlo simulation methods were used to develop the full CDF of the capacity portion of the response surface at step 120. For each MC simulation, random values of $G_{crit}$ and $E_{11}$ were generated based on their respective statistical distribution types and respective statistical parameters. With each set of $G_{crit}$ and $E_{11}$ values generated, the capacity portion of the response surface equation was computed. Following that, a histogram analysis was performed to develop the CDF curve for the capacity portion of the response surface equation.

Once the CDF curve fit was developed at step 122 for the capacity portion of the response surface equation the failure prediction method followed the steps outlined in the Response Surface FPM 88 approach following this embodiment of the invention. Table IV shows the results of estimating the probability of failure using the response surface ST 90 approach.

TABLE IV

Response Surface-ST Prediction Results

| Cycle | P | θ | (demand) | POF | Warning |
|---|---|---|---|---|---|
| Cycle-1 | 30.8 | 12 | 68.52277995 | 0% | Go |
| Cycle-3 | 33.88 | 10.33 | 44.54782678 | 0% | Go |
| Cycle-5 | 27.72 | 13.67 | 86.06125102 | 0% | Go |
| Cycle-7 | 36.96 | 15.33 | 181.6366807 | 15% | Go |
| Cycle-7 | 37 | 16 | 201.9535041 | 16% | No-Go |

The direct FPM approach 92 does not require the development of a response surface to predict the probability of failure. This example used direct FORM to transform the seven random variables (in this example these variables are the material properties, $G_{crit}$, $P_{max}$ and $\Phi$) to equivalent uncorrelated standard normal variables (represented by vector Y). After transformation, a numerical differentiation scheme was employed at step 124 to determine the derivatives of the random variables. In the transformed uncorrelated standard normal space, a linear approximation was constructed to the final failure equation, which in this case is $G>G_{crit}$. The derivatives of the random variables were used at step 126 to determine the perturbed values of the random variables. To estimate the probability of failure using FORM a constrained optimization scheme was adopted to search for the minimum distance from the origin to the transformed failure equation. Mathematically, the problem was formulated the same at Equation (8) where $\beta$ was the minimum distance, but where g(Y) was the transformed failure equation. The method used in this example was formulated by Rackwitz and Fiessler optimization scheme and was used to solve the above constrained optimization scheme. See Rackwitz, R. and Fiessler, B., *Reliability Under Combined Random Load Sequences*, Computers and Structures, Vol. 9, No. 5, pp. 489–494, 1978. The constrained optimization scheme is an iterative process to estimate the probability of failure. A convergence criterion was determined at step 128 (FIG. 2(c)) to force the iterations to converge on a failure probability estimate. After the appropriate criteria, equations, models, and reference data were programmed at step 136 into memory device 34, a first order estimate of the POF was determined at step 152 using FORM as:

$$POF = F(-\beta) \qquad \text{Eq. (10)}$$

where $F(-\beta)$ was the CDF of a standard normal variable (i.e., a normal variable with zero mean value and unit standard deviation). Table V shows example results from estimating the probability of failure using Direct FPM approach.

TABLE V

Direct-FPM Prediction Results

| Cycle | P | θ | POF | Warning |
|---|---|---|---|---|
| Cycle-1 | 30.8 | 12 | 0% | Go |
| Cycle-3 | 33.88 | 10.33 | 0% | Go |

TABLE V-continued

Direct-FPM Prediction Results

| Cycle | P | θ | POF | Warning |
|---|---|---|---|---|
| Cycle-5 | 27.72 | 13.67 | 0% | Go |
| Cycle-7 | 36.96 | 15.33 | 14% | Go |
| Cycle-7 | 37 | 16 | 14% | No-Go |

Like the direct FPM approach, the direct ST 94 approach also does not require the development of a response surface. This example also used Monte Carlo (MC) methods within direct ST 94. The same seven significant variables from Table I were selected. Based on the analysis frequency, previously determined to be two flight cycles, once the sensors gathered the values of the directly sensed variables, values of the inferred variables were randomly generated in step 130 using MC methods and random values of $G_{crit}$ and $E_{11}$ were generated based on their respective statistical distribution types and respective statistical parameters. For each set of directly sensed data, several sets of the inferred variables were generated. For each set of inferred variables generated, the value of the strain energy release rate G was computed in step 194 as shown in FIG. 5(*d*). The number of sets of referred variables was based on the number of simulations to be conducted from step 134. Appropriate criteria, equations, models, and reference data were stored at step 136 in memory 34 of CPU 18.

For each simulation, if $G>G_{crit}$, a failure counter was incremented by one. For example, let us assume that for each set of $P_{max}$ and $\Phi$ sensed, M sets of the inferred variables were generated. Among those M sets, for n sets (n≦M), G was greater than $G_{crit}$. Then the probability of failure would be n/M. Table VI shows example results from estimating the probability of failure using Direct ST approach.

TABLE VI

Direct-ST Prediction Results

| Cycle | P | θ | POF | Warning |
|---|---|---|---|---|
| Cycle-1 | 30.8 | 12 | 0% | Go |
| Cycle-3 | 33.88 | 10.33 | 0% | Go |
| Cycle-5 | 27.72 | 13.67 | 0% | Go |
| Cycle-7 | 36.96 | 15.33 | 16% | Go |
| Cycle-7 | 37 | 16 | 18% | No-Go |

While the foregoing description and drawings represent embodiments of the present invention, it will be understood that various additions, modifications and substitutions may be made therein without departing form the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. The presently disclosed embodiments are therefore to be considered in all respects as illustrative and not restrictive, the scope of the invention being indicated by the appended claims, and not limited to the foregoing description.

We claim:

1. A computer-implemented method for predicting failure in a system, the method comprising:

receiving data associated with a system, the received data including sensed data indicative of a system response to a specific load on the system while the system is in operation other than undergoing a system test;

calculating a prediction indicative of a potential failure of said system using a pre-selected probabilistic model and said received data, the probabilistic model selected to calculate said prediction based on at least the specific load; and wherein the probabilistic model utilizes at least one of fast probability methods and simulation techniques.

2. The method of claim 1, wherein said receiving further comprises receiving system information from said system.

3. The method of claim 1, wherein said calculating a prediction further comprises calculating a prediction of a failure of a component of said system.

4. The method of claim 1, wherein said calculating a prediction further comprises calculating a prediction of a failure of multiple systems based on said prediction.

5. The method of claim 1, further comprising comparing said prediction to criteria.

6. The method of claim 1, further comprising communicating the prediction, and wherein at least one of said calculating and communicating steps occurs at a location remote from said system.

7. The method of claim 1, wherein said probabilistic model comprises multiple pre-selected probabilistic models, wherein at least one of the multiple pre-selected probabilistic models is selected to calculate the prediction based on the one or more pre-determined failure modes of the system.

8. The method of claim 1, further comprising ranking variables in said probabilistic model according to said variable's contribution to said prediction.

9. The method of claim 1, applied to predict failure in a material's microstructure.

10. The method of claim 1, wherein said received data further comprises referred data and inferred data and wherein said method further comprises relating said referred data to a first set of variables, relating said sensed data to a second set of variables, and inferring a third set of variables from said sensed data.

11. The method of claim 1, further comprising sending at least some of said received data to a remote location and wherein said calculating said prediction occurs at said remote location.

12. The method of claim 11, further comprising receiving said prediction from said remote location.

13. The method of claim 1, further comprising developing said probabilistic model prior to said calculating said prediction.

14. The method of claim 13, wherein said developing further comprises:

identifying at least one failure mechanism of a component of said system from said component's characteristics selected from the group consisting of: material properties, environmental conditions, design characteristics, component loading, and component usage;

identifying significant random variables of said at least one failure mechanism;

identifying statistical parameters of said significant random variables; and formulating a strategy for probabilistic analysis based on said identifying steps.

15. The method of claim 14, wherein said received data further comprises referred data and inferred data and wherein said developing step further comprises determining which of said significant random variables are related to said referred data, which of said significant random variables are related to said sensed data, and which of said significant random variables are inferred from said sensed data.

16. The method of claim 13, wherein said developing further comprises setting criteria for communicating said prediction.

17. The method of claim 1, wherein said probabilistic model utilizes fast probability methods.

18. The method of claim 17, wherein said fast probability methods are direct fast probability methods selected from the group consisting of: First Order Reliability Methods, Second Order Reliability Methods, Advanced Mean Value methods, and Mean Value methods.

19. The method of claim 17, wherein said fast probability methods are response surface fast probability methods selected from the group consisting of: First Order Reliability Methods, Second Order Reliability Methods, Advanced Mean Value methods, and Mean Value methods.

20. The method of claim 1, wherein said probabilistic model utilizes simulation techniques.

21. The method of claim 20, wherein said simulation techniques are direct methods selected from the group consisting of: Monte Carlo methods and importance sampling methods.

22. The method of claim 20, wherein said simulation techniques are response surface methods selected from the group consisting of: Monte Carlo methods and importance sampling methods.

23. A computer-implemented method for predicting failure in a system, the method comprising:
receiving data associated with a system, the received data including sensed data indicative of a system response to a specific load on the system while the system is in operation other than undergoing a system test;
calculating a prediction indicative of a potential failure of said system using a pre-selected probabilistic model and said received data, the probabilistic model selected to calculate said prediction based on at least the specific load, wherein the data indicative of a system response to a specific load comprises a bend angle.

24. The method of claim 23, further comprising using the bend angle and the probabilistic model to generate a response surface.

25. A computer-implemented method for predicting failure in a system, the method comprising:
receiving data associated with a system, the received data including sensed data indicative of a system response to a specific load on the system while the system is in operation other than undergoing a system test;
calculating a prediction indicative of a potential failure of said system using a pre-selected probabilistic model and said received data, the probabilistic model selected to calculate said prediction based on at least the specific load, wherein the probabilistic model is selected based on at least one failure mechanism including a failure mechanism described by an equation having at least a capacity section and a demand section.

26. The method of claim 25, further comprising communicating the prediction.

27. An apparatus for monitoring a system, said apparatus comprising:
sensors for acquiring sensed data indicative of a current physical state of a particular system; and
one or more data processing systems including a first computer comprising:
a processor; and
a memory comprising:
instructions for receiving data including said acquired data;
instructions for determining a current operation status of said particular system using a probabilistic model to determine the current operation status based on a probable response of the particular system to one or more external parameters at a current time, and further using said acquired data; and
wherein the probabilistic model utilizes at least one of fast probability methods and simulation techniques.

28. The apparatus of claim 27, wherein said instructions for determining the current operation status further comprise instructions for determining a probable response of at least one component of said system to the one or more external parameters at the current time.

29. The apparatus of claim 27, the data processing system further comprising:
a second computer, said second computer comprising:
a processor; and
a memory, said memory comprising:
instructions for receiving said current operation status; and
instructions for communicating said current operation status; and
a second communication device for communicating said current operation status.

30. The apparatus of claim 27, further including a communication device, and wherein said communication device is configured to generate a warning signal.

31. The apparatus of claim 27, said apparatus further comprising a sending device for sending at least some of said received data to a location remote from said system.

32. The apparatus of claim 31, wherein said first computer is located remote from said system.

33. The apparatus of claim 27, further comprising instructions for comparing said current operation status to criteria.

34. The apparatus of claim 27, wherein said probabilistic model comprises multiple models.

35. The apparatus of claim 27, wherein said probabilistic model comprises variables ranked according to said variables' contribution to said current operation status.

36. The apparatus of claim 27, applied to predict failure in a material's microstructure.

37. The apparatus of claim 27, wherein said received data further comprises referred data and inferred data and wherein said apparatus further comprises instructions for:
relating said referred data to a first set of variables;
relating said acquired data to a second set of variables; and
inferring a third set of variables from said acquired data.

38. The apparatus of claim 27, wherein said probabilistic model utilizes fast probability methods.

39. The apparatus of claim 38, wherein said fast probability methods are direct fast probability methods selected from the group consisting of: First Order Reliability Methods, Second Order Reliability Methods, Advanced Mean Value methods, and Mean Value methods.

40. The apparatus of claim 38, wherein said fast probability methods are response surface fast probability methods selected from the group consisting of: First Order Reliability Methods, Second Order Reliability Methods, Advanced Mean Value methods, and Mean Value methods.

41. The apparatus of claim 27, wherein said probabilistic model utilizes simulation techniques.

42. The apparatus of claim 41, wherein said simulation techniques are direct methods selected from the group consisting of: Monte Carlo methods; and importance sampling methods.

43. The apparatus of claim 41, wherein said simulation techniques are response surface methods selected from the group consisting of: Monte Carlo methods; and importance sampling methods.

44. The apparatus of claim 27, wherein said instructions for creating further comprise instructions for creating a prediction of a failure of multiple systems based on said prediction.

45. The apparatus of claim 27, said probabilistic model is pre-selected based on at least one failure mechanism of a component of said system.

46. The apparatus of claim 45, wherein said at least one failure mechanism relates to a material microstructure.

47. The apparatus of claim 27, further comprising:
 instructions for communicating said current operation status; and
 a communication device for communicating said current operation status.

48. An apparatus for monitoring a system, said apparatus comprising:
 sensors for acquiring sensed data indicative of a current physical state of a particular system; and
 one or more data processing systems including a first computer comprising:
 a processor; and
 a memory comprising:
 instructions for receiving data including said acquired data;
 instructions for determining a current operation status of said particular system using a probabilistic model to determine the current operation status based on a probable response of the particular system to one or more external parameters at a current time, and further using said acquired data, wherein said instructions for determining a probable response of said at least one component of said system to the one or more external parameters at the current time comprises instructions for performing finite element analysis using at least a component configuration and data indicative of the one or more external parameters at the current time.

49. The apparatus of claim 48, wherein the one or more data processing systems further comprise instructions for determining a future operation status of said particular system using the probabilistic model.

50. The apparatus of claim 48, further comprising:
 instructions for communicating said current operation status; and
 a communication device for communicating said current operation status.

51. An apparatus for monitoring a system, said apparatus comprising:
 sensors for acquiring sensed data indicative of a current physical state of a particular system; and
 one or more data processing systems including a first computer comprising:
 a processor; and
 a memory comprising:
 instructions for receiving data including said acquired data;
 instructions for determining a current operation status of said particular system using a probabilistic model to determine the current operation status based on a probable response of the particular system to one or more external parameters at a current time, and further using said acquired data, wherein the probabilistic model selected based on at least one failure mechanism including a failure mechanism is described by an equation including a capacity section and a demand section.

52. The apparatus of claim 51, further comprising:
 instructions for communicating said current operation status; and
 a communication device for communicating said current operation status.

53. A computer program product for predicting failure of a system for use in conjunction with a computer system, said computer program product comprising:
 a computer readable storage medium and a computer program mechanism embedded therein, said computer program mechanism comprising:
 instructions for receiving data including sensed data indicative of a current physical state;
 instructions for determining a failure probability of said system using a probabilistic model and said data, the probabilistic model to determine the failure probability based on modeling a response of the system to at least one force; and
 wherein the probabilistic model utilizes at least one of fast probability methods and simulation techniques.

54. The computer program product of claim 53, wherein the instructions for determining the failure probability of the system further comprise instructions for determining a probable response of at least one component of said system to the at least one force.

55. The computer program product of claim 54, further comprising:
 instructions for determining a future failure probability of said system using the probabilistic model.

56. The computer program product of claim 53, wherein said instructions for determining a failure probability further comprise instructions for determining a failure probability of multiple systems based on said sensed data indicative of the current physical state.

57. The computer program product of claim 53, said probabilistic model is pre-selected based on at least one pre-determined failure mechanism of a component of said system.

58. The computer program product of claim 53, wherein said at least one pre-determined failure mechanism relates to a material microstructure.

59. The computer program product of claim 53, further comprising instructions for comparing said failure probability to criteria.

60. The computer program product of claim 53 wherein said probabilistic model comprises multiple probabilistic models.

61. The computer program product of claim 53, further comprising ranking variables in said probabilistic model according to said variables' contribution to said failure probability.

62. The computer program product of claim 53, applied to predict failure in a material's microstructure.

63. The computer program product of claim 53, wherein said received data further comprises:
 referred data; and
 inferred data and wherein said apparatus further comprises:
 instructions for relating said referred data to a first set of variables; instructions for relating said sensed data to a second set of variables; and instructions for inferring a third set of variables from said sensed data.

64. The computer program product of claim 53, wherein said probabilistic model utilizes fast probability methods.

65. The computer program product of claim 64, wherein said fast probability methods are direct fast probability methods selected from the group consisting of: First Order Reliability Methods, Second Order Reliability Methods, Advanced Mean Value methods, and Mean Value methods.

66. The computer program product of claim 64, wherein said fast probability methods are response surface fast probability methods selected from the group consisting of: First Order Reliability Methods, Second Order Reliability Methods, Advanced Mean Value methods, and Mean Value methods.

67. The computer program product of claim 53, wherein said probabilistic model utilizes simulation techniques.

68. The computer program product of claim 67, wherein said simulation techniques are direct methods selected from the group consisting of: Monte Carlo methods, and importance sampling methods.

69. The computer program product of claim 67, wherein said simulation techniques are response surface methods selected from the group consisting of: Monte Carlo methods, and importance sampling methods.

70. The computer program product of claim 53, further comprising:
a second computer program product, said second computer program product comprising:
a second computer readable storage medium and a second computer program mechanism embedded therein, said second computer program mechanism comprising:
instructions for receiving said failure probability; and
instructions for communicating said failure probability.

71. A computer program product for predicting failure of a system for use in conjunction with a computer system, said computer program product comprising:
a computer readable storage medium and a computer program mechanism embedded therein, said computer program mechanism comprising:
instructions for receiving data including sensed data indicative of a current physical state;
instructions for determining a failure probability of said system using a probabilistic model and said data, the probabilistic model to determine the failure probability based on modeling a response of the system to at least one force, wherein said instructions for determining the probable response of at least one component of the system to the at least one force comprise instructions for performing finite element analysis using at least a component configuration and data indicative of the at least one force.

72. A computer program product for predicting failure of a system for use in conjunction with a computer system, said computer program product comprising:
a computer readable storage medium and a computer program mechanism embedded therein, said computer program mechanism comprising:
instructions for receiving data including sensed data indicative of a current physical state;
instructions for determining a failure probability of said system using a probabilistic model and said data, the probabilistic model to determine the failure probability based on modeling a response of the system to at least one force, wherein the probabilistic model is selected based on at least one pre-determined failure mechanism including a mechanism described by an equation having at least a capacity section and a demand section.

73. A computer-implemented method for predicting failure in a system, the method comprising:
receiving data associated with the system while the system is in operation other than undergoing system test;
during system operation, ascertaining a probability of failure for each of a plurality of pre-determined failure mechanisms using a physics based first probabilistic failure model, wherein said probability of failure for each of said failure mechanisms is based at least partially on said received data and said pre-determined failure mechanisms;
predicting a probability of failure for the system using a physics based second probabilistic failure model, wherein said probability of failure for the system is at least partially based on said probability of failure of said failure mechanisms; and
communicating the probability of failure of the system.

74. The method of claim 73, further comprising, before said ascertaining, determining one or more suitable physics based probabilistic failure models for each failure mechanism.

75. The method of claim 73, wherein said failure mechanisms are selected from the group consisting of: cracking, delamination, shearing, bending, and tension fracture.

76. The method of claim 73, wherein said failure mechanisms are selected from the group consisting of: material properties, environmental conditions, design characteristics, component loading, and component usage.

77. The method of claim 73, wherein said probability of failure for each of said failure mechanisms is further based on variability of physical parameters of said system.

78. The method of claim 73, wherein said probability of failure for each of said failure mechanisms is further based on a variability of directly sensed variables, a variability of referred variables, and a variability of inferred variables.

79. A computer implemented method for predicting failure in a system, comprising:
determining failure mechanisms for a system;
receiving data associated with the system while the system is in operation other than undergoing system test;
selecting at least one suitable physics based probabilistic failure model for each failure mechanism;
ascertaining a probability of failure for each of said failure mechanisms using a selected physics based first probabilistic failure model, wherein said probability of failure for each of said failure mechanisms is based at least partially on said received data, said failure mechanisms, and variability of physical parameters of said system;
predicting a probability of failure for the system using a selected physics based second probabilistic failure model, wherein said probability of failure for the system is at least partially based on said probability of failure for each of said failure mechanisms; and
communicating said probability of failure for the system.

80. The method of claim 79, wherein said variability of physical parameters comprises a variability of directly sensed variables, a variability of referred variables, and a variability of inferred determined variables.

81. The method of claim 79, further comprising, before said communicating, determining a confidence of said probability of failure of said system based on historical failure data.

82. A computer-implemented method for predicting failure in a system, the method comprising:
- receiving data associated with a system, the received data including sensed data indicative of a system response to a specific load on the system while the system is in operation other than undergoing a system test;
- calculating a prediction indicative of a potential failure of said system using a pre-selected probabilistic model and said received data, the probabilistic model selected to calculate said prediction based on at least the specific load, wherein calculating the prediction comprises determining a probable response of at least one component of said system to one or more external parameters by performing finite element analysis using at least a component configuration and data indicative of the one or more external parameters.

83. The computer-implemented method of claim 82, further comprising communicating the prediction.

* * * * *